United States Patent [19]

Shen

[11] Patent Number: 5,416,845
[45] Date of Patent: May 16, 1995

[54] SINGLE AND MULTIPLE CHANNEL BLOCK ADAPTIVE METHODS AND APPARATUS FOR ACTIVE SOUND AND VIBRATION CONTROL

[75] Inventor: Qun Shen, Gilbert, Ariz.

[73] Assignee: Noise Cancellation Technologies, Inc., Linthicum, Md.

[21] Appl. No.: 227,904

[22] Filed: Apr. 15, 1994

Related U.S. Application Data

[63] Continuation of Ser. No. 54,935, Apr. 27, 1993, abandoned.

[51] Int. Cl.$^6$ .............................................. A61F 11/06
[52] U.S. Cl. ...................................................... 381/71
[58] Field of Search ................................... 381/71, 94

[56] References Cited

U.S. PATENT DOCUMENTS

| | | | |
|---|---|---|---|
| 3,826,870 | 7/1974 | Wurm et al. | |
| 4,122,303 | 10/1978 | Chaplin et al. | |
| 4,153,815 | 5/1979 | Chaplin et al. | |
| 4,177,874 | 12/1979 | Angelini et al. | |
| 4,417,098 | 11/1983 | Chaplin | |
| 4,489,441 | 12/1984 | Chaplin | |
| 4,490,841 | 12/1984 | Chaplin et al. | |
| 4,815,139 | 3/1989 | Eriksson et al. | 381/71 |
| 5,018,202 | 5/1991 | Takahashi et al. | 381/71 |
| 5,091,953 | 2/1992 | Tretter | 381/71 |
| 5,097,923 | 3/1992 | Ziegler et al. | |
| 5,224,168 | 6/1993 | Martinez et al. | 381/71 |
| 5,233,540 | 8/1993 | Andersson et al. | 381/71 |

FOREIGN PATENT DOCUMENTS 1190317  3/1959  France .

OTHER PUBLICATIONS

G. B. B. Chaplin, "Anti-noise—the Essex Breakthrough," Chartered Mechanical Engineer, Jan. 1983, pp. 41, et seq.

S. D. Sommerfeldt, "Adaptive Vibration Control of Vibration Isolation Mounts, Using an LMS-Based Control Algorithm," Ph.D. Thesis in Acoustics, Pennsylvania State University, Aug. 1989.

G. B. B. Chaplin, et al., "The Sound of Silence," Engineering, Jul. 1978, pp. 672-673.

G. B. B. Chaplin, et al., "The Essex Solution to Noise and Vibration," The Naval Architect, Mar. 1983, pp. E86-E88.

R. A. Smith, et al., "A Comparison of Some Essex Algorithms for Major Industrial Applications," Proc. Inter-noise '83, 1983, pp. 1-4.

P. M. Nelson, et al., "Development of a Prototype Exhaust Noise Cancellation System for Commercial Vehicle Application," 1986.

B. A. Taylor, "Contranoise—Active Noise Control," Reprint from Noise & Vibration Control Worldwide, Nov. 1984.

W. J. Broad, "New Technology Defeats Unwanted Noise," New York Times, Jun. 30, 1987, pp. Y23, 27.

A. Roure, "Fast Algorithms in Active Noise or Vibration Control," 1988 IEEE, pp. 2582-2585.

(List continued on next page.)

*Primary Examiner*—Curtis Kuntz
*Assistant Examiner*—Ping W. Lee
*Attorney, Agent, or Firm*—James W. Hiney

[57] ABSTRACT

A method and apparatus is described for actively canceling a primary noise source to produce a desired noise level at at least one location. The apparatus comprises a signal processor which drives at least one actuator, at least one error sensor and a primary noise reference signal. The error sensors are positioned proximate to each of the locations. The output of the error sensors and the primary noise reference signal are sent to the signal processor. The relationship between the driving output of the processor and the output of the error sensors is modeled by a block of filter coefficients. Based upon the model and the primary noise reference signal, the processor drives the actuator to generate a canceling noise at the location. The processor calculates differences between the desired noise level and the output of the sensors. A variable convergence factor and a gradient block are derived from the residual noise and are used to adapt the filter coefficients.

5 Claims, 10 Drawing Sheets

OTHER PUBLICATIONS

L. J. Eriksson, et al., "The Selection and Application of an IIR Adaptive Filter for Use in Active Sound Attenuation," IEEE Transactions on Acoustics, Speech and Signal Processing, ASSP-34, No. 4, Apr. 1987, pp. 433-437.

S. J. Elliott, et al., "A Stochastic Gradient Algorithm for Multichannel Active Sound Control," IFAC Adaptive Systems in Control and Signal Processing, 1986, pp. 329-333.

L. J. Erikkson, et al., "The Use of Random Noise for On-line Transducer Modelling in an Adaptive Active Attenuation System," Presented at 112th Meeting of Acoustical Society of America, Dec. 1986.

S. J. Eliott, et al., "An Adaptive Algorithm for Multichannel Active Control," Proc. IOA, 1986.

S. P. King, et al., "Minimisation of Helicopter Vibration Through Active Control of Structural Response," $\approx$1985, pp. 14-1, 14-13.

G. B. B. Chaplin, "Waveform Synthesis—The Essex Solution To Cancelling Periodic Noise and Vibration," Wolfson Centre For Electronic Cancellation of Noise and Vibration, 1983.

T. S. Berge, "A Feasibility Study of Active Noise Cancellation of Low Frequency Sound Inside Vehicle Cabs," Dissertation, University of Southampton, 1982.

Q. Shen, et al., "Time and Frequency Domain X-Block LMS Algorithms for Single Channel Active Noise Control," Second International Congress on Recent Developments In Air-and Structure-Borne Sound and Vibration, Mar. 4-6, 1992, pp. 353-360.

SINGLE AND MULTIPLE CHANNEL BLOCK ADAPTIVE METHODS AND APPARATUS FOR ACTIVE SOUND AND VIBRATION CONTROL

This is a Continuation Application of U.S. patent application Ser. No. 08/054,935 filed Apr. 27, 1993, now abandoned.

TECHNICAL FIELD

The present invention relates to vibration cancellation systems, in particular, to active noise cancellation systems.

BACKGROUND OF THE INVENTION

Noise attenuation can be achieved by using either active or passive attenuation techniques. Although conventional passive sound absorption techniques can successfully attenuate high-frequency sound, they often are costly, cumbersome and very inefficient when used for low-frequency noise attenuation. For example, passive noise reduction methods used for vehicle and aircraft cabins primarily involve a shielding treatment, typically absorptive and damping materials applied to the body structure. These materials are often bulky, introducing extra weight and tending to decrease fuel efficiency.

In contrast, active sound control provides a more efficient and lightweight alternative to such low-frequency noise reduction applications. The basic concept in active noise canceling is the superposition of one or more secondary sound fields onto the primary noise field which is to be attenuated. The secondary noise field is, ideally, exactly the same amplitude as the primary noise but 180° out of phase.

Early active noise reduction systems relied largely on continuous-time methods and analog hardware. With the advances in technology and the development of efficient and highly sophisticated discrete-time algorithms, digital active noise cancellation has become feasible.

A modern active noise cancellation system usually comprises:

1) Sensing devices, most frequently microphones for sound or accelerometers for vibration, used to detect the primary noise to be attenuated (input or detection sensors) and to monitor the cancellation performance (error sensors);
2) Actuators, most commonly audio speakers, used to produce the secondary noise field;
3) Electronic devices including analog to digital (A/D) converters, digital to analog (D/A) converters, anti-aliasing filters, power amplifiers, parallel to serial (P/S) and serial to parallel (S/P) converters, sample and hold circuits and the like; and
4) A signal processor, including both hardware for fast real-time computation, and software which implements the method to control the actuator output based upon predetermined performance criteria.

Referring to FIG. 1A, a single-channel active noise control system 100 includes an input sensor 102 and an error sensor 104 (e.g. microphones), an actuator speaker 106, and an active noise controller (signal processor) 108. As noted, active noise attenuation relies on generating secondary noise field ("anti-noise") which will cancel the noise produced by an external source 110.

In order to create anti-noise, input sensor 102 monitors noise source 110 and error sensor 104 monitors any residual noise at the position where the noise reduction is desired. Signal processing device 108 uses the measurements from input sensor 102 and error sensor 104 and establishes an anti-noise signal that drives speaker 106. Speaker 106 responsively generates the anti-noise, identical in amplitude and frequency, but 180° out of phase with the primary noise to be canceled.

However, the noise measured at sensors 102, 104 and at speaker 106, even with speaker 106 turned off, will be different. This difference is primarily due to acoustic paths between the sensors 102, 104 and speaker 106 and characteristics of the hardware elements. The acoustic paths are generally modeled by transfer functions. Since the acoustical path may vary with time, an adaptive system identification (characterization) scheme is also desirable. Furthermore, since the sensors, the actuator, and the electronic circuitry are not ideal, electrical transfer functions for the hardware employed must also be taken into account during adaptation. Thus, the complete transfer function is electro-acoustic in nature.

Accordingly, it is desirable that signal processor 108 generates a drive signal to anti-noise source 106, by operating upon the residual error signal from sensor 104, in accordance with a transfer function reflecting the actual overall electro-acoustic transfer function of the system.

The term "adaptive filter" refers to a time-varying digital filter having coefficients which are adjusted according to predetermined criteria, such as, for example, minimizing a cost function. A "cost function" is a function dependent upon the underlying noise distribution. Adaptive filters are often used to improve the performance of input/output systems by filtering out the noise without distorting the signal. The coefficients of the adaptive filter can be adjusted using stochastic gradient or recursive least square or appropriate adaptive algorithms in the signal processor. For example, the least mean square (LMS) algorithm is a stochastic gradient algorithm which uses the mean square error as a cost function. The adaptive algorithms require little or no prior knowledge of the input signal and thus are suitable for time-varying systems.

Adaptive filters have found applications in a variety of fields. For example, adaptive filters have been used in speech coding, spectral estimation, adaptive control, and in digital filter design. In addition, the concept of adaptive filters has been utilized in echo cancellation, noise reduction in electro-cardiography and speech, and antenna sidelobe cancellation. Although, the concept of active noise attenuation is, in general, known, there is a growing interest in developing and/or tailoring robust adaptive filters for this application. This interest has been fueled both by the recent developments in the field of signal processing and also by the emergence of digital signal processors with real-time capabilities.

The fundamental signal processing problem associated with active noise control lies in the design of a system to control the output of the adaptive anti-noise filter. The adaptive algorithms required for active noise control tend to be more complex than those used in the classical noise echo cancellation applications. This difference can be attributed to the following:

1) The acoustic paths (delays) between the anti-noise sources and the sensors;
2) The transfer functions of the electro-acoustic devices;

3) The acoustical cross-coupling interference between channels (in multichannel applications);
4) The acoustic feedback from the anti-noise sources to the input sensor;
5) Acoustic laws which govern the active noise propagation mechanism; and
6) Potential time-varying sources.

As a result, adaptive filtering algorithms must be tailored specifically to the characteristics of the active noise control system.

Adaptive algorithms for active noise control usually involve two operational modes: system modeling, and system control. System modeling characterizes the electro-acoustic properties of the system. System control computes the anti-noise based on some prescribed criteria. The system modeling is usually done without the primary noise present. However, it can also be performed during the noise control operation to accommodate systems with time-varying characteristics.

Also, the input signal to the processor is conditioned prior to processing. Signal pre-conditioning is generally emphasized in active noise control applications to account for the transfer functions between the sensors and the actuators. The adaptive filter structure for this application is commonly referred to as the "filtered-X structure."

In typical applications, the algorithms must operate in real time, and require all the computations be completed within the sampling period. Rapid convergence is required in order to ensure short adaptive response to transient noises. Such transients are often due to the random nature of the noise source. An exemplary conventional system employs a processor 108 comprising an adaptive finite impulse response (FIR) filter where the number of taps is I implementing a well-known Least Means Square (LMS) algorithm. The term "tap" refers to the number of filter coefficients $w_k$. The output of the filter y(k) is given by the convolution of the input signal x(k) and the sequence of filter coefficients $w_k$ for each of the samples, i.e., $$y(k) = \sum_{i=0}^{I-1} w_k(i) x(k-i) \qquad \text{Eq. (1)}$$

Where k designates a particular time index and i is a particular tap. The input signal x(k) and the filter coefficients $w_k$ can be expressed in vector form as $$\underline{x} = [x(k) x(k-1) \ldots x(k-I+1)]^T \qquad \text{Eq. (2)}$$

and $$\underline{w}_k = [w_k(0) \; w_k(1) \ldots w_k(I-1)]^T \qquad \text{Eq. (3)}$$

The output of the adaptive system is then written as $$y(k) = \underline{x}_k^T \underline{w}_k \qquad \text{Eq. (4)}$$

where the superscript $^T$ represents the transpose of the vector or the matrix and the underbar is used to denote vectors and matrices. The error between the desired output and the filter output is given by $$e(k) = d(k) - y(k) = d(k) - \underline{x}_k^T \underline{w}_k \qquad \text{Eq. (5)}$$

where d(k) is the desired signal of the system at the time index k.

The cost function (J) of the LMS algorithm is the mean squared error, i.e.

$$J = E\{e(k)^2\} = E\{[d(k)-y(k)]^2\} = E\{[d(k)-\underline{x}_k^T \underline{W}_k]^T [d(k)-\underline{x}_k^T \underline{w}_k]\} \qquad \text{Eq. (6)}$$

where E {.} denotes the expectation operator.

Taking the first derivative of the cost function with respect to the filter coefficient vector $w_k$ yields the gradient $$\underline{\nabla}_k = \frac{\partial J}{\partial \underline{w}_k} = \left[ \frac{\partial J}{\partial w_k(0)} \; \frac{\partial J}{\partial w_k(1)} \cdots \frac{\partial J}{\partial w_k(I-1)} \right]^T \qquad \text{Eq. (7)}$$
$$= -2E\{e(k)\underline{x}_k\}$$

The gradient determines the rate and direction of change of the cost function with respect to each individual filter coefficient. Coefficient vector $w_k$ is thereby updated to adapt filter 208 to changing conditions. Coefficient vector $w_k$ of the adaptive filter may be updated by the steepest descent algorithm, i.e., $$\underline{w}_{k+1} = \underline{w}_k - \mu \underline{\nabla}_k = \underline{w}_k + 2\mu E\{e(k)\underline{x}_k\} \qquad \text{Eq. (8)}$$

Using the instantaneous estimate of the gradient, i.e.

$$\hat{\underline{\nabla}}_k = -2e(k)\underline{x}_k \qquad \text{Eq. (9)}$$

The update equation may be expressed by $$\underline{w}_{k+1} = \underline{w}_k - \mu \hat{\underline{\nabla}}_k = \underline{w}_k + 2\mu e(k)\underline{x}_k \qquad \text{Eq. (10)}$$

where $\mu$ is the convergence factor or step size which controls the convergence speed and the stability of the algorithm. The optimal (Wiener) solution, associated with the minimization of the cost function is therefore given by $$\underline{w}^0 = \underline{r}^{-1} \underline{p} \qquad \text{Eq. (11)}$$

where r is the input autocorrelation matrix $$\underline{r} = E\{\underline{x}_k \underline{x}_k^T\} \qquad \text{Eq. (12)}$$

and p is the crosscorrelation vector:

$$\underline{p} = E\{d(k)\underline{x}_k\} \qquad \text{Eq. (13)}$$

The LMS algorithm converges in mean if the convergence factor $\mu$ is bounded by $$0 < \mu < \frac{1}{\lambda_{max}} \qquad \text{Eq. (14)}$$

where $\lambda_{max}$ is the maximum eigenvalue of the autocorrelation matrix. Hence, one of the inherent disadvantages of the LMS algorithm is that all the coefficients adapt with the speed of the slowest mode.

A version of the LMS algorithm has been developed for the use with a multichannel active noise control system. The term "multi-channel" refers to the use of more than one actuator and/or error sensor in an active noise control system.

To expand, the Multichannel LMS (MLMS) algorithm may be used in conjunction with a multichannel active nose cancellation system having M error sensors and N actuators associated therewith (M≧N). Such a system is referred to as an MxN active noise control system.

Referring to FIG. 1B, n exemplary multi-channel active noise control system 120 includes an input sensor 122, respective error sensors 124 (e.g. microphones), respective actuator speakers 126, and an active noise controller (signal processor) 128. As noted, active noise attenuation relies on generating secondary noise field ("anti-noise") cancelling the noise produced by an external source 130.

In order to facilitate the generation of anti-noise, input sensor 122 monitors noise source 130, and error sensors 124 monitor any residual noise at the position where the noise reduction is desired. Signal processing device 128 uses the measurements from input sensor 122 and error sensors 124 and establishes an anti-noise signal that drives speakers 126. Speakers 126 responsively generate the anti-noise, suitably identical in amplitude and frequency, and 180° out of phase with respect to the primary noise to be canceled.

As with the LMS system, the transfer function of the electro-acoustic path between sensor and actuator is modelled. However, for an M×N active noise control system, MN adaptive filters in processor 128 are required for such modelling. In addition, N adaptive filters from speakers 126 are used to control the actuator output to minimize the total mean squared errors.

In recent years, there has been considerable interest in block adaptive filtering algorithms. Block algorithms involve the use of block processing (i.e. concurrent processing of plural samples) instead of sequential processing of the monitoring data. Block processing refers to the use of blocks of data as opposed to individual data points. In the standard sequential implementation of LMS digital filters described above, a scalar output is computed from the convolution of the sequential input and the filter coefficients. In the block implementation of digital filters, on the other hand, a block of filter outputs are computed for each block of inputs.

Block processing presents a number of advantages. For example, the gradient can be estimated more accurately, and the algorithm can be implemented more efficiently in the frequency domain, and thus, individual discrete frequency components of the processed signals can be accessed and controlled directly. Specifically, the block implementation of digital filters has advantages over the sequential implementation of digital filters. For example, the fast Fourier transform (FFT) can be employed to implement a block filter in the frequency domain and hence reduce the number of computations per unit sample for high order implementation. The block filters are also more suitable for parallel processor implementations.

Block LMS (BLMS) algorithms have been developed in both the time and in the frequency domain. Although block adaptive filters were originally proposed for sequential processors, recently the emphasis has been on their implementation on parallel processors. By using a parallel processor, such as a systolic array processor (SAP) or a wavefront array processor (WAP), the throughput rate of a block adaptive filter could be improved considerably.

In contrast to the sequential LMS algorithm, which minimizes the individual sample mean square error, the Block LMS (BLMS) minimizes a mean square error estimated from a block of errors. In order to describe an actual sound control system utilizing the BLMS algorithm, the following variables are defined: j is the block index, L is the block length, and k, l are defined as in the sequential algorithm. Referring to FIG. 2, an active noise control system 200 employing a block adaptive FIR filter 201 may be schematically represented as: serial-to-parallel (S/P) circuitry 202 and 204; parallel-to-serial (P/S) circuitry 206; an adaptive FIR filter 208; respective sectioning circuitry 210 and 212; a summer 214 (e.g. error sensor); and a processor 216.

The input signal x(k) is applied to serial to parallel circuitry 202 which reorganizes input signal x(k) from a sequential input to a block input (e.g. accumulates a predetermined number of sequential data inputs). In practice, input signal x(k) is received from an input sensor 102 (e.g. microphone or accelerometer). In adaptive FIR filter 208, the now block format input signal x(k) is convolved with block coefficient vector w(k) (described below). The resulting block output vector is reconverted to a sequential organization by parallel to serial circuitry 206. The resulting sequential output signal is subject to a sectioning procedure 210 which organizes the data for use by an actuator 106 (not shown) for broadcast. The resultant output $y_j(e)$ is applied to summer 214. In practice, the output $y_j(e)$ corresponds to the cancelling anti-noise generated by an actuator (speaker 106).

Desired signal d(k) is subject to sectioning procedure 212 which also organizes the data for proper application before being applied to summer 214. In practice, summer 214 is error sensor 104 (microphone) that sums desired signal $d_j(l)$ and output signal $y_j(l)$ acoustically.

Summer 214 directs error signal $e_j(l)$ to a serial to parallel circuitry 204 for computation in processor 216. Processor 216 compares $e_j(l)$ to desired signal d(k) to adjust the block coefficient vector w(k) to minimize the error signal $e_j(l)$.

It should be understood that processor 216 and adaptive FIR filter 208 in practice correspond to active noise controller 108 of FIG. 1A. It should also be understood that while many of the components are shown as separate components, in practice the components could physically be the same element. For example, serial to parallel circuitry 202 could instead be implemented in software as part of active noise controller 108.

The sequences x(k) and d(k) correspond to the input and desired signals, respectively, at the $k^{-th}$ time index and $d_j(l)$ and $y_j(l)$ are the $1^{-th}$ entries of the block desired signal and output vectors at the $j^{-th}$ block (l=1, 2, ..., L), respectively.

A mathematical description of FIG. 2 will now be presented. The block output $y_j$ after sectioning procedure 210 may be organized as follows.

$$\underline{y}_j = [y_j(jL)\ y_j(jL+1) \ldots y_j(jL+L-1)]^T \qquad \text{Eq. (15)}$$

where each entry of the output vector is obtained from Equation 4. The block coefficient vector $w_j$ and the block input x(k) matrix as $$\underline{w}_j = [w_j(0)\ w_j(1) \ldots w_j(I-1)]^T \qquad \text{Eq. (16)}$$

and $$\underline{X}_j = \begin{bmatrix} x(jL) & x(jL-1) & \ldots x(jL-I+1) \\ x(jL+1) & x(jL) & \ldots x(jL-I+2) \\ \vdots & \vdots & \vdots \\ x(jL+L-1) & x(jL+L-2) & \ldots x(jL+L-I) \end{bmatrix} \quad \text{Eq. (17)}$$

The block output of the FIR filter 208 can then be represented by $$\underline{y}_j = \underline{X}_j \underline{w}_j \quad \text{Eq. (18)}$$

The block desired signal $d_j(l)$ vector is defined as $$\underline{d}_j = [d(jL)\ d(jL+1)\ \ldots\ d(jL+L-1)]^T \quad \text{Eq. (19)}$$

and the error signal $e_j(l)$ from the summer 214 can be written as $$\underline{e}_j = \underline{d}_j - \underline{y}_j = \underline{d}_j - \underline{X}_j \underline{w}_j \quad \text{Eq. (20)}$$

The block mean squared error (BMSE) is used as a cost function in the processor 210, i.e., $$J_B = \frac{1}{L} E\{\underline{e}_j^T \underline{e}_j\} \quad \text{Eq. (21)}$$

The gradient of the cost function with respect to the filter coefficients vector $w_j$ is given by $$\underline{\nabla}_j = \frac{\partial J_B}{\partial \underline{w}_j} = -\frac{2}{L} E\{\underline{X}_j^T \underline{e}_j\} \quad \text{Eq. (22)}$$

The BLMS algorithm in processor 216 is updated by $$\underline{w}_{j+1} = \underline{w}_j - \mu_B \hat{\underline{\nabla}}_j = \underline{w}_j + \frac{2\mu_B}{L} \underline{X}_j^T \underline{e}_j \quad \text{Eq. (23)}$$

where $\hat{\underline{\nabla}}_j$ is the estimate of the block gradient. It can be shown that the BLMS algorithm of processor 216 converges in the mean to the optimal (Wiener) solution if the convergence factor is bounded by $$0 < \mu_B < \frac{1}{\lambda_{max}} \quad \text{Eq. (24)}$$

where $\lambda_{max}$ is the maximum eigenvalue of the input autocorrelation matrix.

As noted previously, an improvement to the BLMS algorithm involves the use of a Filtered-X structure to account for the electro-acoustic transfer function between the sensors and actuators. Referring to FIG. 3, such an exemplary active noise control system 300, may be schematically represented as respective serial to parallel converters 302, 304 and 306, parallel to serial converter 308, a processor 310 including a block FIR filter 312 and a BLMS algorithm 314, and a summer 316 (e.g. acoustic summation with microphones). The secondary path $H^s$ is modeled first in the absence of the primary noise x(k). The block finite impulse response (FIR) filter is then adapted using the X-BLMS algorithm.

In the X-BLMS algorithms, the error signal e(k), the desired signal d(k), and the coefficient vectors W are defined as:

$$\underline{e}_j = [e(js)\ e(js+1)\ \ldots\ e(js+L-1)]^T \quad \text{Eq. (25)}$$

$$\underline{d}_j = [d(js)\ d(js+1)\ \ldots\ d(js+L-1)]^T \quad \text{Eq. (26)}$$

and $$\underline{w}_j = [w_j(0)\ w_j(1)\ \ldots\ w_j(I-1)]^T \quad \text{Eq. (27)}$$

where: the integer j is the block index; L is the block length; and s is the block shift, the number of new data samples in successive blocks of data (as will be explained, a measure of overlap; if s=L there is no overlap of data between successive data blocks).

The filtered reference matrix r(k) at the $j^{-th}$ block is given by $$\underline{r}_j = \begin{bmatrix} r(js) & r(js-1) & \ldots r(js-I+1) \\ r(js+1) & r(js) & \ldots r(js-I+2) \\ \vdots & \vdots & \vdots \\ r(js+L-1) & r(js+L-2) & \ldots r(js+L-I) \end{bmatrix} \quad \text{Eq. (28)}$$

Each component of the matrix $r_j$ is filtered through $H^s$, an estimate of the transfer function $H^s$ derived during system modelling and defined by $$r(k) = \sum_{i=0}^{J-1} h^s(i) x(k-i) \quad \text{Eq. (29)}$$

An error vector, $e_j$, obtained from summer 316 dand representative of the differences between the desired signal d(k) and the output signal y(k), and is given by $$\underline{e}_j = \underline{d}_j + \underline{r}_j \underline{w}_j \quad \text{Eq. (30)}$$

The block mean squared error (BMSE), the cost function in X-BLMS algorithm processor 314 is expressed:

$$J_B = \frac{1}{L} E\{\underline{e}_j^T \underline{e}_j\} = \frac{1}{L} E\{[\underline{d}_j + \underline{r}_j \underline{w}_j]^T [\underline{d}_j + \underline{r}_j \underline{w}_j]\} \quad \text{Eq. (31)}$$

$$= \frac{1}{L} [E\{\underline{d}_j^T \underline{d}_j\} + \underline{w}_j^T E\{\underline{r}_j^T \underline{d}_j\} + E\{\underline{d}_j^T \underline{r}_j\} \underline{w}_j + \underline{w}_j^T E\{\underline{r}_j^T \underline{r}_j\} \underline{w}_j]$$

The gradient for the cost function $J_B$, with respect to the coefficient vector $w_j$ may thus be expressed as:

$$\underline{\nabla}_j^B = \frac{\partial J_B}{\partial \underline{w}_j} = \left[ \frac{\partial J_B}{\partial w_j(0)} \quad \frac{\partial J_B}{\partial w_j(1)} \quad \ldots \quad \frac{\partial J_B}{\partial w_j(I-1)} \right]^T \quad \text{Eq. (32)}$$

$$= \frac{1}{L} [E\{\underline{r}_j^T \underline{d}_j\} + 2E\{\underline{r}_j^T \underline{r}_j\} \underline{w}_j] = \frac{2}{L} E\{\underline{r}_j^T \underline{e}_j\}$$

and estimated in the X-BLMS algorithm implemented in processor 314 by:

$$\hat{\underline{\nabla}}_j^B = \frac{2}{L} \underline{r}_j^T \underline{e}_j \quad \text{Eq. (33)}$$

The update equation for the X-BLMS algorithm 314 used to update the filter coefficients W in the block FIR filter 312 is given by $$w_{j+1} = \underline{w} - \mu_B \hat{\nabla}_{\underline{j}}^B \qquad \text{Eq. (34)}$$

$$= w_j - 2\frac{\mu_B}{L} r_j^T e_j$$

The X-BLMS and BLMS algorithms are advantageous as compared to the conventional sequential LMS approach with respect to gradient noise. In both the X-BLMS and the BLMS the gradient is estimated from a block of data rather than a single sample. Hence, the gradient noise is less than the noise associated with the sequential LMS algorithm.

In addition, the X-BLMS algorithm can be updated (i.e. recompute filter coefficient) using varying extents of overlap between successive groups of data (e.g. a block-by-block or a sample-by-sample scheme).

The block shift s, in the formulation, specifies the updating scheme employed in the algorithm. The block shift s can be chosen to be between the integers 1 and L. When s=1, the X-BLMS is updated on a sample-by-sample basis with maximum overlapping. For s=L, algorithms are updated block-by-block in a disjoint manner. For any value of $1 < s < L$, a certain degree of block overlapping is involved.

Block overlapping implies reuse of data. For example, if $s=1<L$, $L-1$ samples of old data are used as components of the next data block. Only one new data sample is used to form the new data block. Data reuse may improve the convergence speed at the expense of additional computations.

The length of the block and the manner of filter updates should be determined based on the statistical nature of the noise signal: for a stationary input signal, long data blocks without overlapping may be advantageously used; for a non-stationary signal short blocks and data overlapping tend to be advantageous.

An optimal solution of the X-BLMS can be obtained by $$\underline{w}^0 = -\underline{r}^{-1}\underline{p} \qquad \text{Eq. (35)}$$

where r and p are the autocorrelation matrix and the crosscorrelation vector respectively, i.e., $$\underline{p} = \frac{1}{L} E\{r_j^T d_j\} \qquad \text{Eq. (36)}$$

and $$\underline{r} = \frac{1}{L} E\{r_j^T r_j\} \qquad \text{Eq. (37)}$$

It can be shown that the adaptive filter coefficients W converge in the mean to the optimal solution if $$0 < \mu_B < \frac{1}{\lambda_{max}} \qquad \text{Eq. (38)}$$

where the $\lambda_{max}$ is the maximum eigenvalue of the autocorrelation matrix of the filtered reference signal.

The system identification scheme for the X-BLMS is different from the identification scheme for the LMS or the BLMS algorithm. The main difference lies in the fact that the adaptive FIR filter function 312 is cascaded with the transfer function $\hat{H}^s$.

The above discussion relates to time domain algorithms which analyze the data sequentially even though the data may be organized in a block format. However, it is often desirable to transform the input signal x(k) prior to processing into the frequency domain by way of either a fast Fourier transform (FFT) or a discrete Fourier transform (DFT). The use of a Fourier transform is often desirable as it allows the use of frequency-normalized convergence factors as well as separate control of the different frequency components in sound. This factor may result in faster convergence speed.

In addition, frequency domain algorithms become very efficient in high order filter implementations. Thus, while the initial extra processing step may slow computations, the difference may be overcome by the gain in efficiency in such applications.

However, it would be desirable to improve the convergence speed of the X-BLMS algorithm to allow faster reaction time to transient conditions. In addition, while the convergence factor $\mu_B$ is constrained it is not explicitly determined. In practice, the convergence factor $\mu_B$ is determined by trial and error. It would be desirable to explicitly determine the proper factor without resorting to trial and error. Further, any method which can achieve faster convergence would also be desirable.

Furthermore, while the sequential LMS technique has been extended to the multichannel situation, extension of block techniques has not been previously reported. Thus, extensions of the single channel techniques described above to the multichannel case would be very desirable.

SUMMARY OF THE INVENTION

The present invention provides a method and apparatus for actively canceling noise from a primary source to produce a desired noise level at at least one location. In accordance with a preferred embodiment of the present invention, an apparatus is provided comprising a controller (e.g. signal processor) which cooperates with at least one actuator, at least one error sensor and a primary noise reference signal. The output of the error sensors and the primary noise reference signal are desirably input into the signal processor. The error sensors are suitably positioned proximate each of the locations where the primary noise source is to be silenced. The relationship between the driving output of the processor and the output of the error sensors is modeled by a set of filter coefficients. Based upon the filter coefficients block and the primary noise reference signal, the processor drives the actuator to generate a canceling noise at the predetermined locations. The processor uses any differences between the desired noise level and the output of the error sensors to update the output signal. An optional time-varying convergence factor and a gradient block are derived from the differences and are used to adapt the coefficient values comprising the filter coefficient block.

BRIEF DESCRIPTION OF THE DRAWINGS

The preferred exemplary embodiment of the present invention will hereinafter be described in connection with the appended drawing, wherein like designations denote like elements; and.

DETAILED DESCRIPTION OF THE PREFERRED EXEMPLARY EMBODIMENT

Figure 1A:
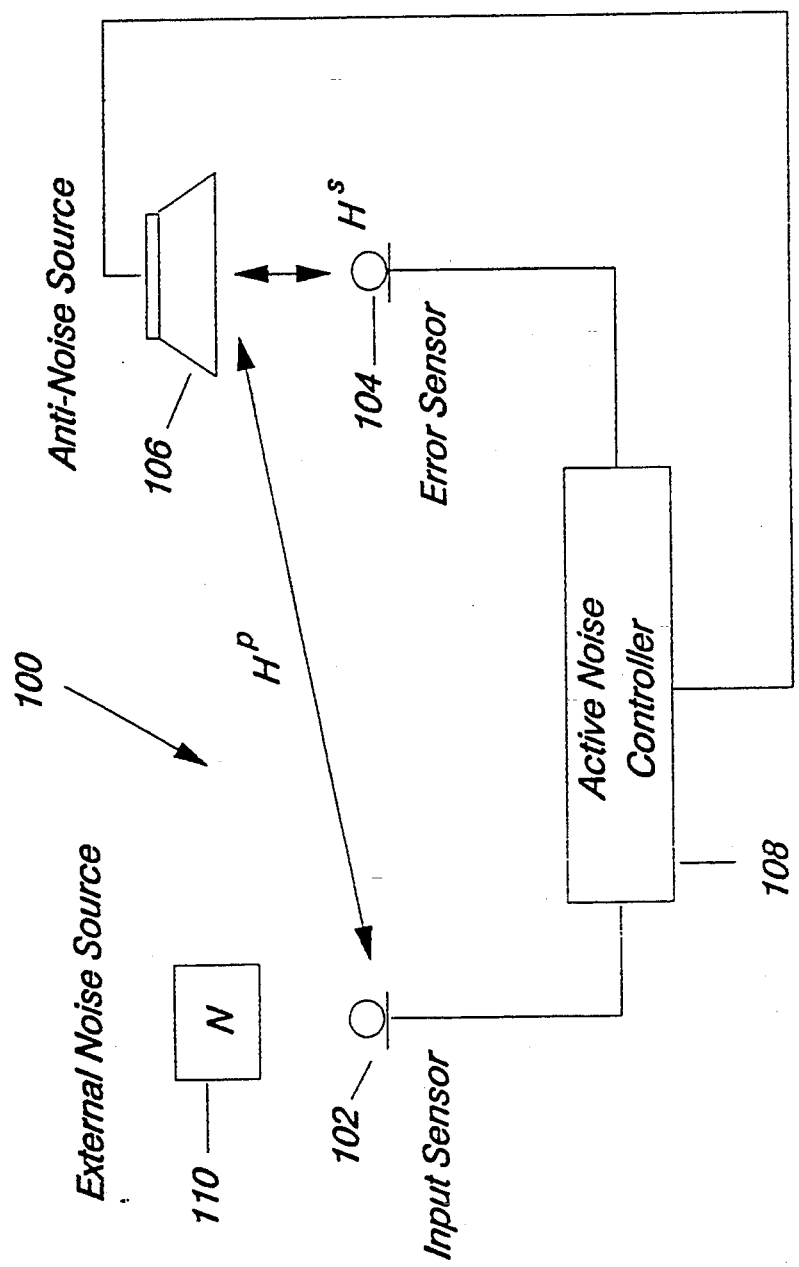
FIGS. 1A and B are diagrams of typical single-channel and multi-channel active noise control systems.
Figure 1B:
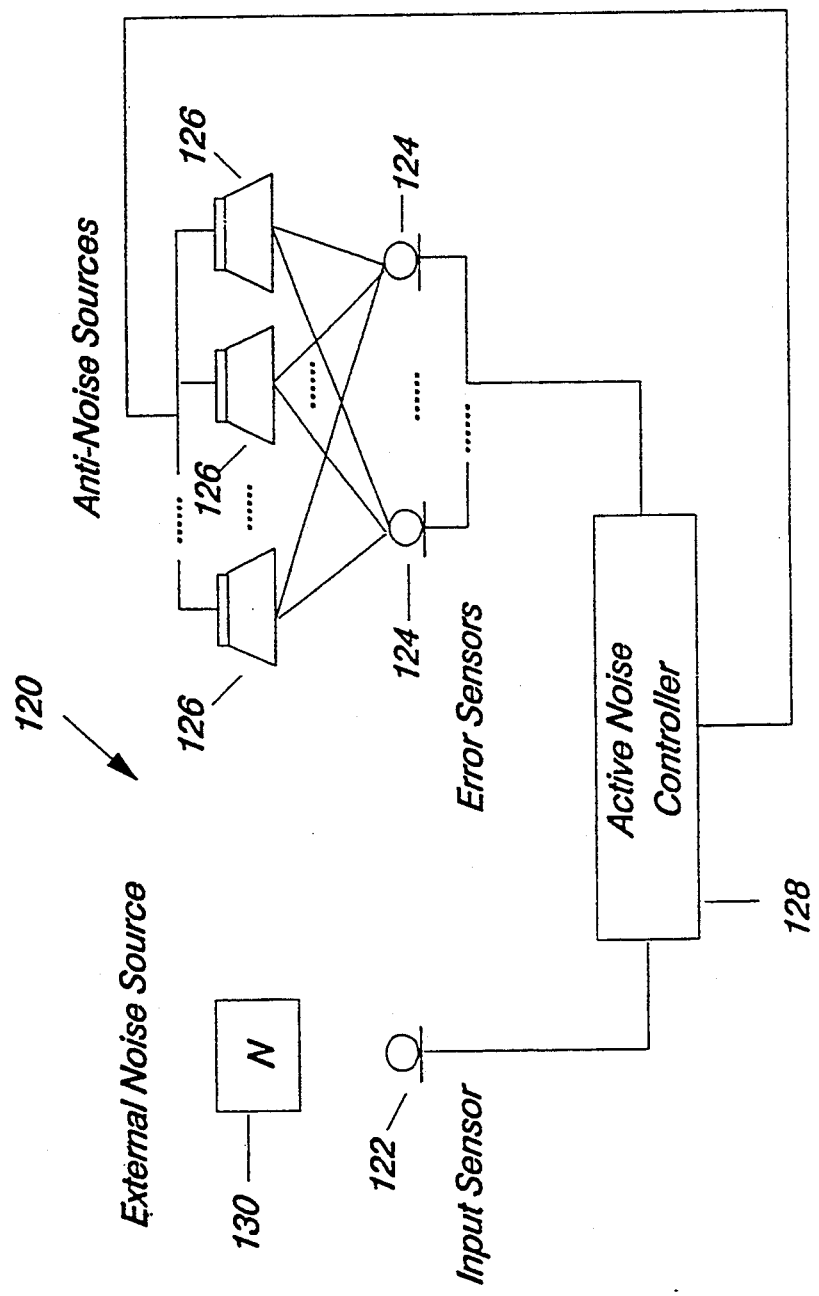
Figure 2:
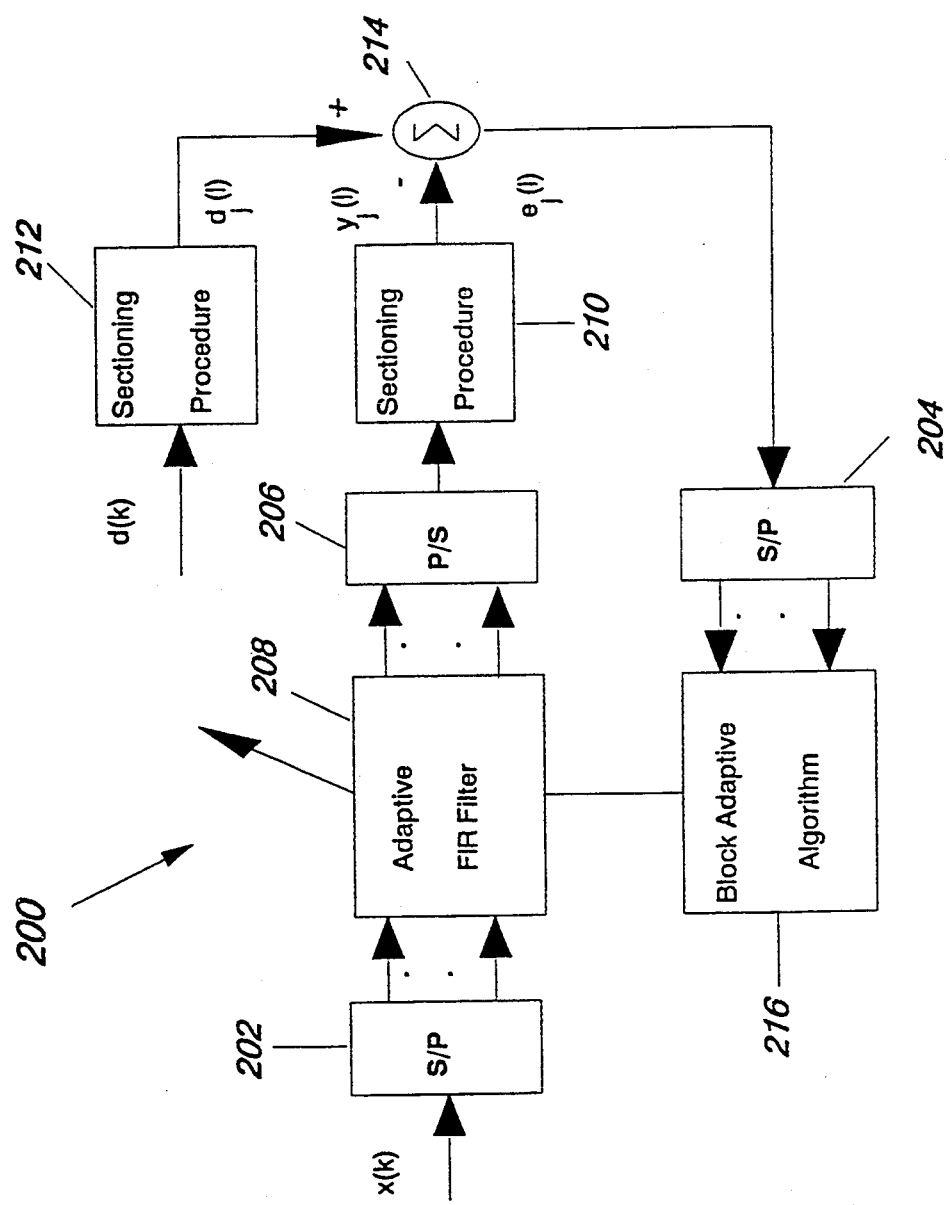
FIG. 2 is a diagram of a block least mean square adaptive finite impulse response (FIR) filter.
Figure 3:
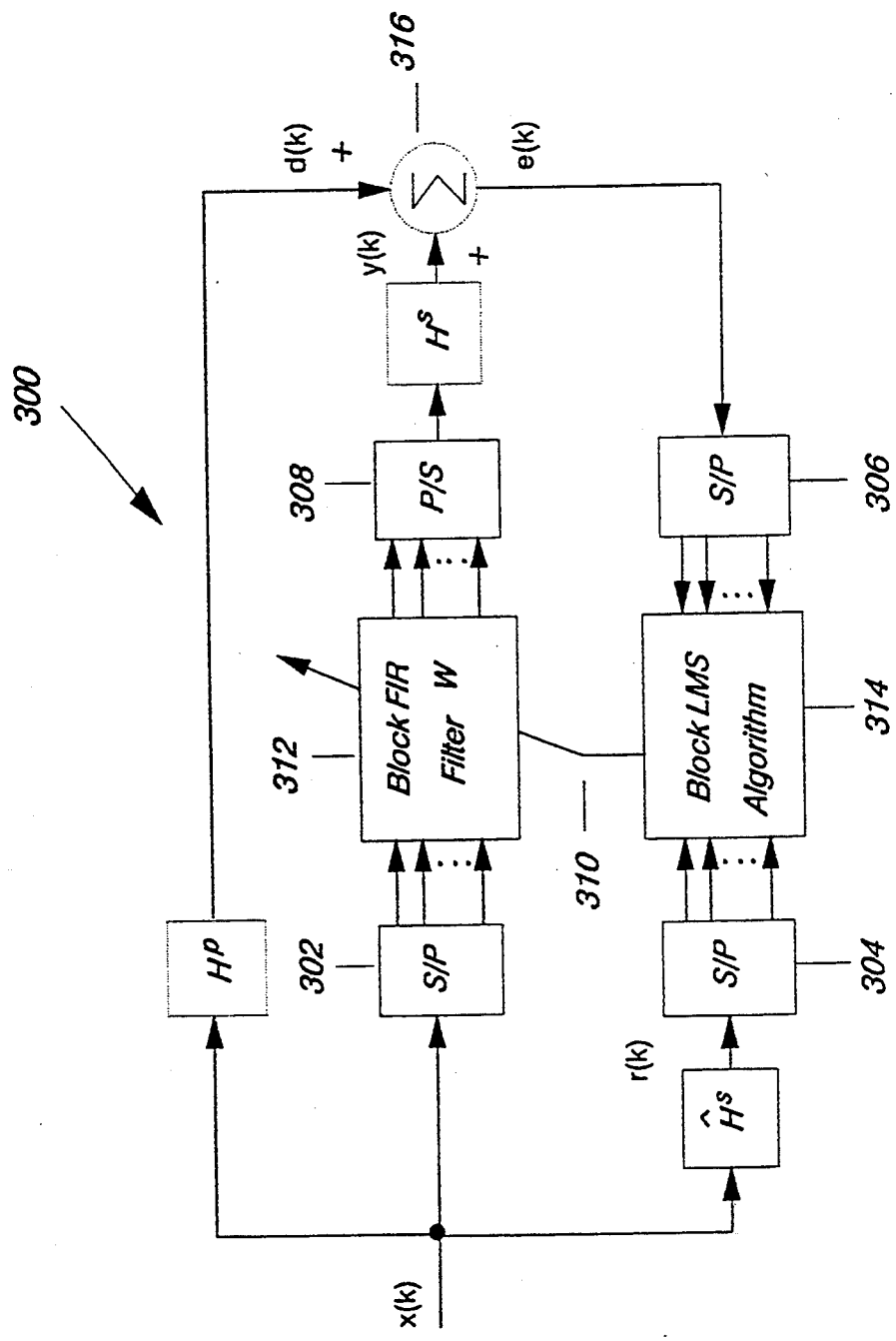
FIG. 3 is a block diagram for the filtered-X block least mean square method.

The following discussion refers to a series of algorithms as exemplary embodiments of the present invention. These embodiments do not thereby limit the invention to the particular examples discussed. Any algorithms which function analogously are included within the scope of the present invention.

As previously discussed, an adaptive filter function has been considered in the prior art employing an X-BLMS algorithm with a fixed convergence factor. In accordance with one aspect of the present invention, the convergence performance of the X-BLMS algorithm can be improved by employing an optimal time-varying convergence factor. The X-BLMS with a time-varying convergence factor is hereinafter referred to as the optimal X-BLMS (X-OBLMS) method. The time-varying convergence factor is considered to be optimal since it is computed such that the cost function may be manipulated (i.e. minimized) from one block of data to the next. Faster convergence speed is thus achieved and the method therefore has better tracking capability particularly in the presence of changing noise conditions.

In an exemplary X-OBLMS system, under the same active sound control scheme generally analogous to that used in the X-BLMS system, the update equation of the X-OBLMS algorithm may be given by $$\underline{w}_{j+1} = \underline{w}_j - \mu_j^B \hat{\nabla}_j^B \qquad \text{Eq. (39)}$$
$$= \underline{w}_j - 2\left(\frac{\mu_j^B}{L}\right)\underline{r}_j^T \underline{e}_j$$

where $\mu_j^B$ provides different corrections from one block to the next.

The time-varying convergence factor, $\mu_j^B$, can be obtained by expressing the errors in the $(j+1)$-th block as a function of the errors in the $j$-th block. In fact, the error function at the $(j+1)$-th block can be expanded in terms of the error function at the $j$-th block using the Taylor series expansion, i.e.

$$e_{j+1}(l) = e_j(l) + \sum_{i=0}^{I-1} \frac{\partial e_j(l)}{\partial w_j(i)} \delta w_j(i) + \qquad \text{Eq. (40)}$$

$$\frac{1}{2!} \sum_{i=0}^{I-1} \sum_{i'=0}^{I-1} \frac{\partial^2 e_j(l)}{\partial w_j(i) \partial w_j(i')} \delta w_j(i) \delta w_j(i') + \text{HOT} \ (l=1,2,\ldots,L)$$

where "HOT" stands for the higher order terms and $$\delta w_j(i) = w_{j+1}(i) - w_j(i) \ i=0,\ldots,I-1$$
$$\delta w_j(i') = w_{j+1}(i') - w_j(i') \ i'=0,\ldots,I-1 \qquad \text{Eq. (41)}$$

Since the error signal is suitably a linear function in the filter coefficients, derivatives with order higher than one in Eq. (40) are zeros and therefore $$e_{j+1}(l) = e_j(l) + \sum_{i=0}^{I-1} \frac{\partial e_j(l)}{\partial w_j(i)} \delta w_j(i) \qquad \text{Eq. (42)}$$

Applying Eq. (42) to each entry of the error vector and expressing it in a vector form, $$\underline{e}_{j+1} = \underline{e}_j + \frac{\partial \underline{e}_j}{\partial \underline{w}_j} \delta \underline{w}_j = \underline{e}_j + \underline{r}_j \delta \underline{w}_j \qquad \text{Eq. (43)}$$

and $$\delta \underline{w}_j = \underline{w}_{j+1} - \underline{w}_j = -2\left(\frac{\mu_j^B}{L}\right)\underline{r}_j^T \underline{e}_j \qquad \text{Eq. (44)}$$

Substituting Eq. (44) into Eq. (43) yields $$\underline{e}_{j+1} = \underline{e}_j - \frac{2}{L}\mu_j^B \underline{r}_j \underline{r}_j^T \underline{e}_j \qquad \text{Eq. (45)}$$

The cost function at the $(j+1)$-th block may thus be expressed as $$\hat{J}_B(j+1) = \frac{1}{L}[\underline{e}_{j+1}^T \underline{e}_{j+1}] \qquad \text{Eq. (46)}$$
$$= \frac{1}{L}\left[\underline{e}_j - \frac{2}{L}\mu_j^B \underline{r}_j \underline{r}_j^T \underline{e}_j\right]^T \left[\underline{e}_j - \frac{2}{L}\mu_j^B \underline{r}_j \underline{r}_j^T \underline{e}_j\right]$$

Taking the gradient of the cost function $\hat{J}_B(j+1)$ with respect to the convergence factor $\mu_j^B$ and setting it to zero, i.e., $$\frac{\partial \hat{J}_B(j+1)}{\partial \mu_j^B} = \frac{1}{L} \frac{\partial [\underline{e}_{j+1}^T \underline{e}_{j+1}]}{\partial \mu_j^B} = 0 \qquad \text{Eq. (47)}$$

the $\mu_j^B$ may then be obtained by $$\mu_j^B = \frac{L}{2} \frac{\alpha \hat{\nabla}_j^{BT} \hat{\nabla}_j^B}{\hat{\nabla}_j^{BT} \underline{r}_j^T \underline{r}_j \hat{\nabla}_j^B} \qquad \text{Eq. (48)}$$

where $\nabla^B_j = 2\underline{r}_j^T \underline{e}_j / L$ is the gradient estimate and $\alpha=1$.

The convergence factor $\mu_j^B$ in Eq. (48) is designed primarily for improving convergence speed of the adaptive algorithm. The value of $\mu_j^B$ may be large initially and may change quite rapidly from one iteration to the next in some cases. In these cases, misadjustment and the variation of the sound pressure level may be large as well. To avoid the transient affect due to the rapid change of the sound and improve the misadjustment, a small scaling factor $\alpha$ is introduced to scale down $\mu_j^B$, where $0<\alpha<1$. When a small scaling factor is introduced for the time-varying convergence factor, a smoother convergence curve is obtained.

A frequency domain algorithm may be implemented either via a circular convolution or a linear convolution technique. The frequency domain algorithm using circular convolution (XC-FLMC) uses a straight Fourier transform of all the time domain data sequences. The circular convolution technique saves computational steps at the expense of additional errors. However, if the data lengths are long, the errors are small and can be neglected.

In contrast, the linear convolution algorithm is an exact implementation of the X-BLMS in the frequency domain (X-FLMS). Linear convolution requires more computational power but gives greater accuracy.

Figure 4:
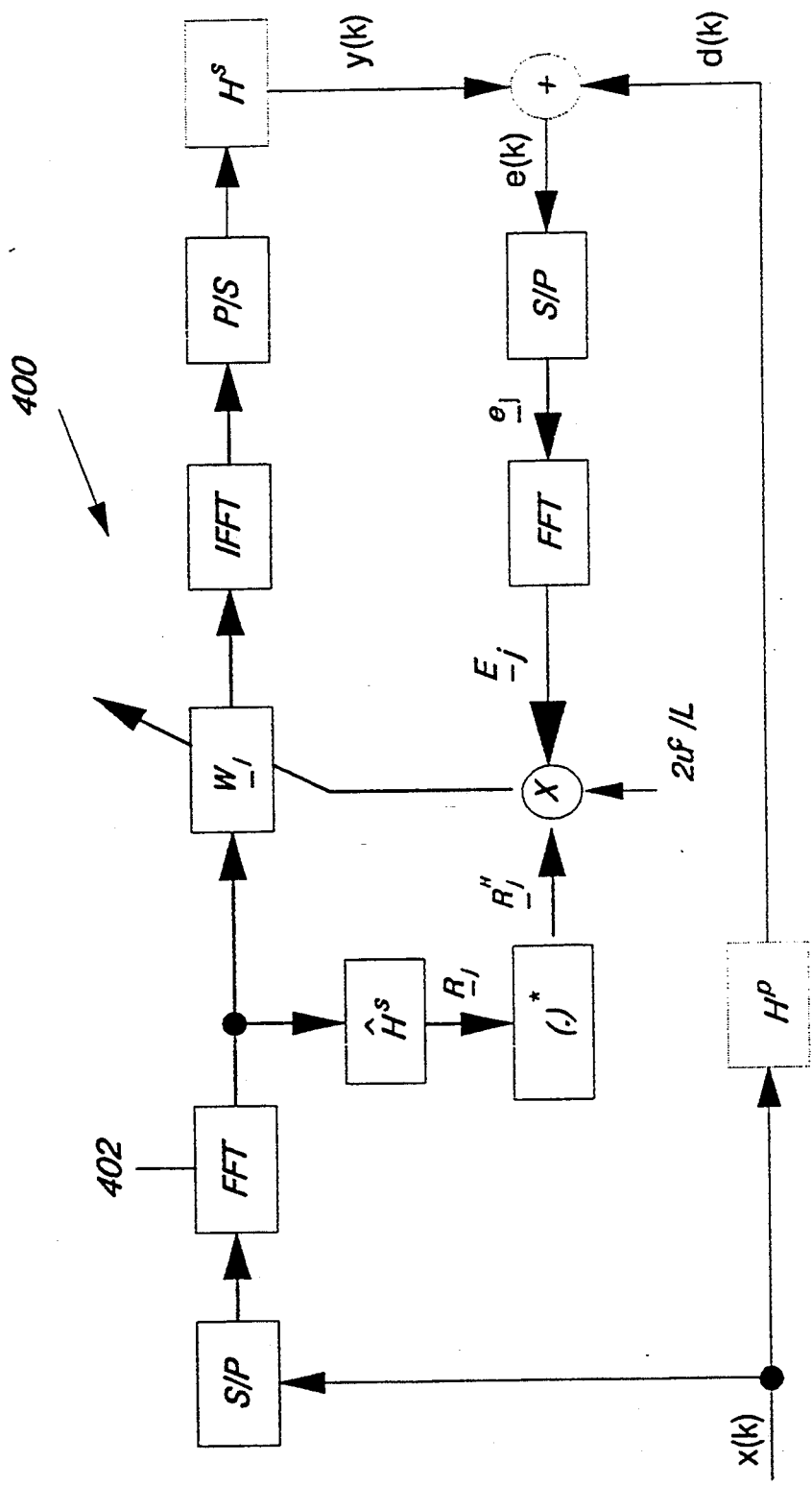
FIG. 4 is a block diagram of filtered-X frequency domain (circular convolution) least mean square system.
Figure 5:
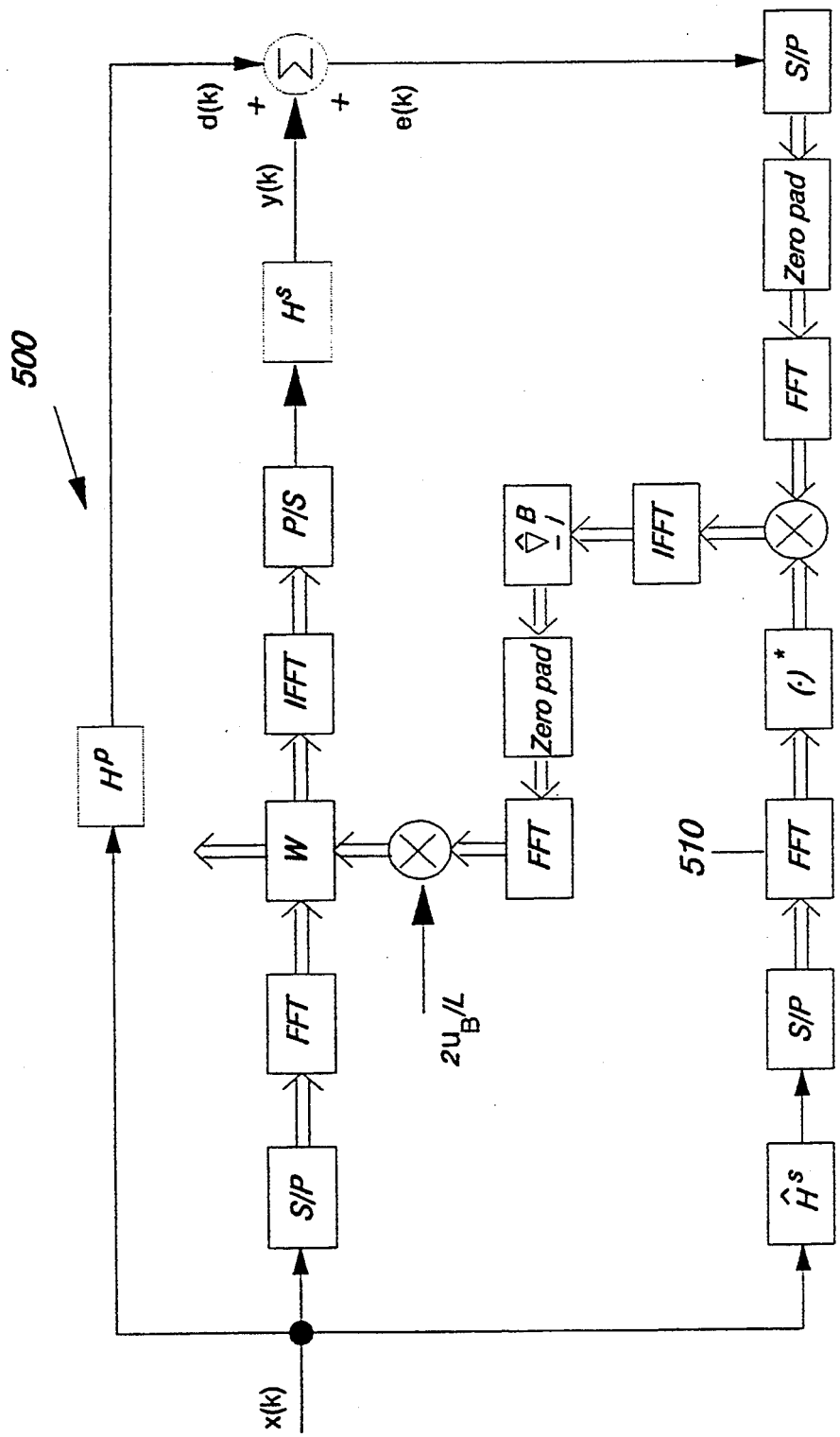
FIG. 5 illustrates the block diagram for the filtered-X frequency domain least mean square system.

Referring to FIGS. 4 and 5, block diagrams of the linear convolution X-FLMS system 400 and the circular convolution XC-FLMS system 500 are shown. As noted above, the differences between the two techniques involve the comparative positioning of a fast Fourier transformer 402 in FIG. 4 and a fast Fourier transform 510 in FIG. 5. Transformation after $\hat{H}^s$ in FIG. 5 implements the X-BLMS exactly while the transformation before $\hat{H}$ in FIG. 4 only changes the incoming data.

As a convention in this application, lower case letters are used to represent the time-domain signals and upper case letters represent the frequency domain signals.

Although the X-FLMS algorithm requires more computations than the XC-BLMS algorithm, it also offers some computational savings in high order cases relative to the time-domain algorithm. The X-FLMS allows for direct access and control of adaptation of individual frequency components and achieves faster convergence for highly correlated signals. The computational savings of the X-FLMS should be weighted against its programming complexity and memory requirements. Since the X-FLMS is the exact implementation of the X-BLMS, it has identical convergence properties as the X-BLMS algorithm.

The time-varying convergence factor can also be computed efficiently in the frequency domain for both XC-FLMS and X-FLMS type algorithms. The frequency domain algorithms with an optimal time-varying convergence factor are hereinafter referred to as the XC-OFLMS and the X-OFLMS algorithms respectively. Using the Taylor expansion technique for both the real and imaginary parts of the error function, the time-varying convergence factor $\mu_j^c$ for the XC-OFLMS can be obtained by $$\mu_j^c = \frac{L}{2} \frac{\alpha \hat{\underline{V}}_j^{cH} \hat{\underline{V}}_j^c}{\hat{\underline{V}}_j^{cH} R_j^{cH} R_j^c \hat{\underline{V}}_j^c} \quad \text{Eq. (49)}$$

and the update equation of the XC-OFLMS is given by $$W_{j+1}^c = W_j^c - 2\left(\frac{\mu_j^c}{L}\right)\hat{\underline{V}}_j^c \quad \text{Eq. (50)}$$

The time-varying convergence factor for the X-FLMS can be obtained by computing $\mu_j^B$ in the frequency domain.

The complexity of the different algorithms is given in Table 1. The analysis given here is based on the block-by-block updating scheme.

To facilitate the evaluation of the computational efficiency realized by frequency domain implementation, the following complexity ratios may be defined:

TABLE 1

| Complexity of the Single Channel Algorithms | | |
|---|---|---|
| Algorithms | Real Multiplies | Real Adds |
| X-LMS | 3LI + L | 3LI − 2L |
| X-BLMS | 3LI + L | 3LI − 2L |
| X-OBLMS | 4LI + 2L + I | 4LI + I + 2L − 2 |
| XC-FLMS | 3L log$_2$ (L/2) + 7L | 4.5L log$_2$ (L/2) + 4L |
| XC-OFLMS | 3L log$_2$ (L/2) + 13L (+ 1 division) | 4.5L log$_2$ (L/2) + 9L |
| X-FLMS | 12L log$_2$L + L$^2$ + 8L | 18L log$_2$L + L$^2$ + 3L |
| X-OFLMS | 14L log$_2$l + L$^2$ + 10L (+ 1 division) | 21L log$_2$L + L$^2$ + 5L |

$$CR_1 = \frac{\text{multiplies} + \text{adds}X - BLMS}{\text{multiplies} + \text{adds}XC - FLMS} \quad \text{Eq. (51)}$$

$$CR_2 = \frac{\text{multiplies} + \text{adds}X - BLMS}{\text{multiplies} + \text{adds}X - FLMS} \quad \text{Eq. (52)}$$

$$CR_3 = \frac{\text{multiplies} + \text{adds}X - OBLMS}{\text{multiplies} + \text{adds}XC - OFLMS} \quad \text{Eq. (53)}$$

$$CR_4 = \frac{\text{multiplies} + \text{adds}X - OBLMS}{\text{multiplies} + \text{adds}X - OFLMS} \quad \text{Eq. (54)}$$

Table 2 shows complexity comparisons for different number of taps of the filters. It is shown that the XC-FLMS and the XC-OFLMS become efficient when the number of filter taps is at least eight (8). The X-FLMS and the X-OFLMS achieve computational savings when the tap number are at least sixty-four (64) and thirty-two (32), respectively.

TABLE 2

| | Complexity Ratios | | | | | |
|---|---|---|---|---|---|---|
| | The Filter Taps | | | | | |
| Complexity Ratio | 8 | 16 | 32 | 64 | 128 | 256 |
| CR$_1$ | 1.81 | 2.83 | 3.94 | 6.84 | 12.08 | 21.62 |
| CR$_2$ | 0.40 | 0.58 | 0.84 | 1.20 | 1.61 | 2.01 |
| CR$_3$ | 1.72 | 3.65 | 5.86 | 9.98 | 17.39 | 30.83 |
| CR$_4$ | 0.50 | 0.86 | 1.18 | 1.62 | 2.13 | 2.66 |

The single-channel block adaptive methods presented above are used primarily for one-dimensional applications. The existing adaptive methods, such as the filtered-X (X-LMS) and the multi-channel filtered-X LMS (MLMS) algorithms, are limited to the sequential case. Block adaptive algorithms have conventionally not been applied to multichannel active noise attenuation. Although multichannel block adaptive algorithm (MBAAs) generally address substantively the same active sound control problem as the MLMS, they have several advantages over the MLMS. For example: a) they are associated with less gradient noise because they utilize an entire block of errors to estimate the gradient, b) they can incorporate overlap between successive blocks of data (e.g. be updated block-by-block or sample-by-sample), and c) they can be implemented efficiently in the frequency domain. Frequency domain implementations allow for separate control of the adaptation gain of individual frequency components and they can be beneficial in cases where the input data is harmonic.

Although the MBAA is based on essentially the same active control structure as the MLMS, it differs from the MLMS in that it organizes the data in a block form such that the sum of squared errors over a short time window (block) is minimized. By taking the average over a block of data, a gradient estimate of lower variance may be obtained. For stationary and ergodic data, the average block gradient is generally closer to the true ensemble gradient.

Figure 6:
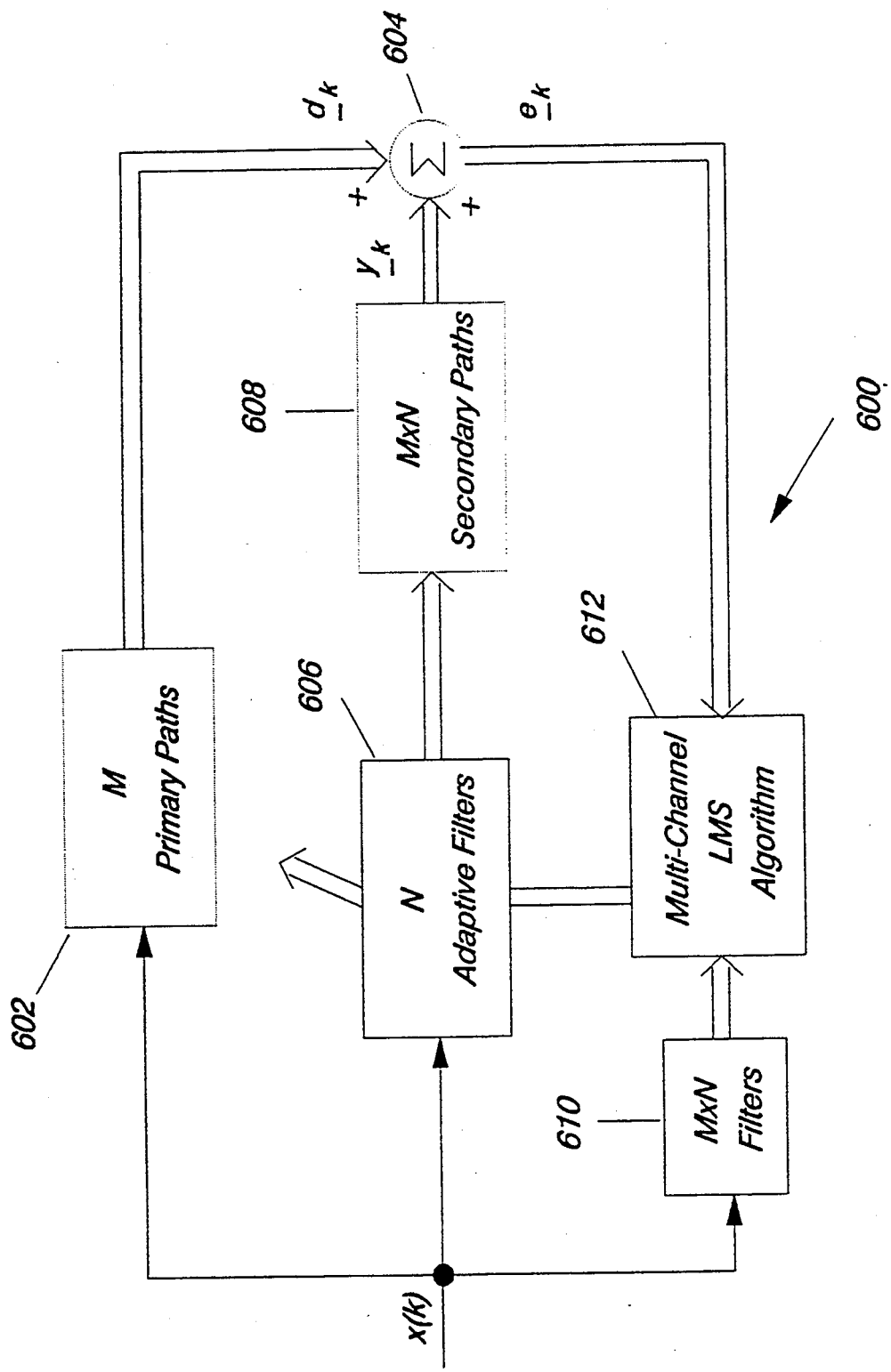
FIG. 6 illustrates a block diagram for the multichannel least mean square algorithm.

An exemplary active noise cancellation system controller 600 employing an MLMS algorithm may be schematically represented as shown in FIG. 6. An input signal x(k) is divided into M primary paths 602, a respective path associated with representing each of the M number of error sensors 604. In turn, the input signal is fed into N adaptive filters 606 where N represents the number of actuators. The combination of N actuators and M error sensor 604 results in M×N secondary paths 608.

As a consequence, the input signal x(k) is filtered through M×N filters 610 before being fed into the multichannel LMS algorithm processor 612. In turn, algorithm processor 612 updates the filter coefficients in N adaptive filters 606 in accordance with, for example, the M×N filtered x(k) 610 and an error signal vector e(k) received from the error sensors 604.

Figure 7:
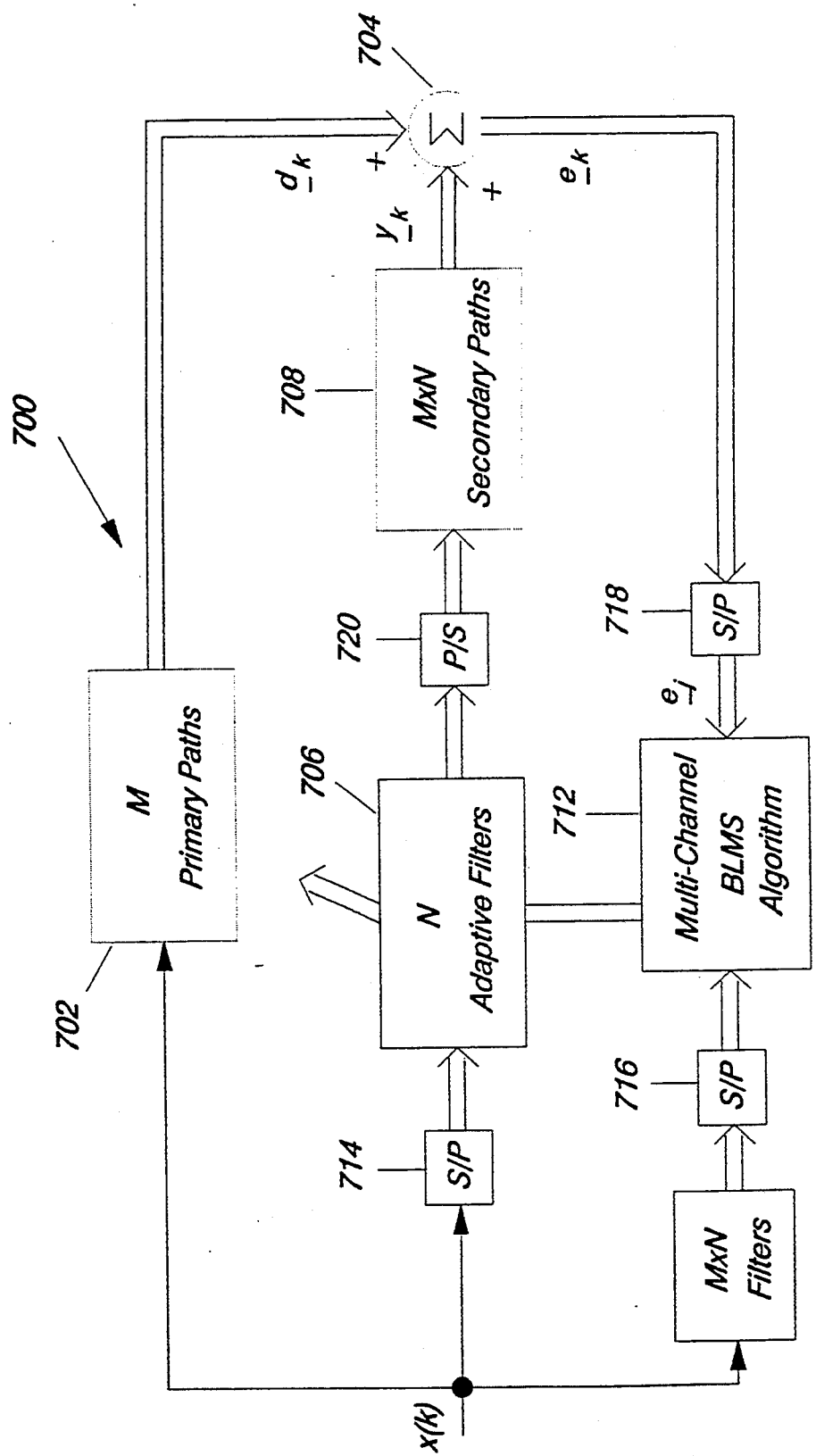
FIG. 7 illustrates a block diagram for the multichannel block adaptive algorithm.

In contrast, FIG. 7 illustrates the block diagram for an exemplary multichannel block adaptive algorithm (MBAA) system 700. The MBAA system suitably includes all elements of the MLMS including M primary paths 702, N error sensors 704, N adaptive filters 706, M×N secondary paths 708, M×N filters 702 and the multichannel BLMS algorithm 712. However, the MBAA suitably utilizes blocks instead of sample by sample data entry. That technique suitably employs the use of series to parallel converters 714, 716 and 718 to alter the data streams from x(k) and $e_k$ to block format. That conversion then suitably employs a parallel to serial converter 720 to reconvert the series to generate an output $y_{k'}$.

The MBAA can be represented mathematically as follows. An error signal $e_k$ vector generated by summer 704, a desired signal $d_r$, and an output signal $y_k$ generated by N adaptive filters 706 vectors at the $j$-th block are defined by $$\underline{e_{m,j}} = [e_m(js)\ e_m(js+1)\ \ldots\ e_m(js+L-1)]^T \qquad \text{Eq. (55)}$$

$$\underline{d_{m,j}} = [d_m(js)\ d_m(js+1)\ \ldots\ d_m(js+L-1)]^T \qquad \text{Eq. (56)}$$

and $$\underline{w_{n,j}} = [w_{n,j}(0)\ w_{n,j}(1)\ \ldots\ w_{n,j}(I-1)]^T \qquad \text{Eq. (57)}$$

where $e_{m,j}$, $d_{m,j}$ (m=1,2, ..., M) are the error $e_k$ and desired signal $d_k$ vectors, at the $m$-th sensor 704 and $j$-th block respectively. And $w_{n,j}$ is the $n$-th filter 706 coefficient vector at the $j$-th block. The multichannel block vectors are given by, $$\underline{e_j} = [\underline{e_{1,j}}^T \underline{e_{2,j}}^T \ldots \underline{e_{m,j}}^T \ldots \underline{e_{M,j}}^T]^T \qquad \text{Eq. (58)}$$

$$\underline{d_j} = [\underline{d_{1,j}}^T \underline{d_{2,j}}^T \ldots \underline{d_{m,j}}^T \ldots \underline{d_{M,j}}^T]^T \qquad \text{Eq. (59)}$$

and $$\underline{w_j} = [w_{1,j}(0)\ w_{1,j}(1)\ \ldots\ w_{1,j}(I-1) \qquad \text{Eq. (60)}$$
$$|w_{2,j}(0)\ w_{2,j}(1)\ \ldots\ w_{2,j}(I-1)$$
$$|\ \ldots\ |w_{N,j}(0)\ w_{N,j}(1)\ \ldots\ w_{N,j}(I-1)]^T$$

where $e_j$, $d_j$ are (ML)×1 error and primary noise vectors at the $j$-th block, respectively, and $w_j$ is an (NI)×1 adaptive coefficient vector 706 at the $j$-th block. Furthermore, define $$\underline{r_{m,j}} = [\underline{r_{m,1,j}}\ \underline{r_{m,2,j}}\ \ldots\ \underline{r_{m,n,j}}\ \ldots\ \underline{r_{m,N,j}}] \qquad \text{Eq. (61)}$$

where $$\underline{r_{m,n,j}} = \qquad \text{Eq. (62)}$$

$$\begin{bmatrix} r_{m,n}(js) & r_{m,n}(js-1) & \ldots & r_{m,n}(js-I+1) \\ r_{m,n}(js+1) & r_{m,n}(js) & \ldots & r_{m,n}(js-I+2) \\ \vdots & \vdots & & \vdots \\ r_{m,n}(js+L-1) & r_{m,n}(js+L-2) & \cdots & r_{m,n}(js-I+L) \end{bmatrix}$$

Here $r_{m,n,j}$ is an L×I filtered reference 712 matrix for the path between the $m$-th sensor and the $n$-th actuator, at the $j$-th block and n=1,2, ..., N. Each entry of $r_{m,n,j}$ is suitably comprises a filtered reference signal, for example, defined in Eq. (29); and $r_{m,j}$ suitably comprises an L×(NI) filtered reference matrix for the $m$-th sensor. Finally, define $$\tilde{r}_j = [\underline{r_{1,j}}^T\ \underline{r_{2,j}}^T\ \ldots\ \underline{r_{m,j}}^T\ \ldots\ \underline{r_{M,j}}^T]^T \qquad \text{Eq. (63)}$$

where $\tilde{r}^j$ is an (ML)×(NI) filtered reference matrix at the $j$-th block. The cost function may then be defined as the sum of the block mean squared errors 712 given in Eq. (64) i.e., $$J_B = \frac{1}{L} E\{\underline{e_j}^T \underline{e_j}\} \qquad \text{Eq. (64)}$$
$$= \frac{1}{L} [E\{\underline{d_j}^T \underline{d_j}\} + 2\underline{w_j}^T E\{\tilde{r}_j^T \underline{d_j}\} + \underline{w_j}^T E\{\tilde{r}_j^T \tilde{r}_j\}\underline{w_j}]$$

where the block error vector is given by $$\underline{e_j} = \underline{d_j} + \tilde{r}_j \underline{w_j} \qquad \text{Eq. (65)}$$

Taking the gradient of $J_B$ with respect to the filter coefficients yields $$\underline{\nabla}^B = \frac{\partial J_B}{\partial \underline{w_j}} = \frac{2}{L} [E\{\tilde{r}_j^T \underline{e_j}\}] \qquad \text{Eq. (66)}$$

Using the gradient estimate, $$\hat{\underline{\nabla}}^B = \frac{2}{L} \tilde{r}_j^T \underline{e_j} \qquad \text{Eq. (67)}$$

the filter coefficients are updated by processor 712 by $$\underline{w_{j+1}} = \underline{w_j} - 2\left(\frac{\tilde{\mu}_B}{L}\right)\tilde{r}_j^T \underline{e_j} \qquad \text{Eq. (68)}$$

The standard multichannel LMS algorithm is a special case of the MBAA; when the block length L is one, the MBAA defaults to the MLMS.

One of the advantages of the MBAA is its flexible update schemes. As with the single-channel block algorithm, the MBAA can be updated using varying extents of overlap (e.g. block-by-block or sample-by-sample). Again, the updating schemes may be specified by the block shift s. When the block shift is one (s=1), the algorithm is preferably updated in a sample-by-sample manner, that is, only one new data sample is used to form a new data block. For s=L, the algorithm is updated in a disjoint manner. When 1<s<L, L−s samples of old data along with s new data samples form a new data block and the MBAA is updated once per s samples. Such flexible update schemes provide different implementations for various applications. A proper update scheme is suitably determined based on the stochastic nature of sound as discussed in the single-channel case.

The MBAA converges in the mean to the optimal solution;

$$\underline{w}^0 = -\tilde{r}^{-1}\tilde{\underline{p}} \qquad \text{Eq. (69)}$$

where $$\tilde{r} = \frac{1}{L} E\{\tilde{\underline{r}}_j^T \tilde{\underline{r}}_j\} \qquad \text{Eq. (70)}$$

and $$\tilde{\underline{p}} = \frac{1}{L} E\{\tilde{\underline{r}}_j^T \underline{d}_j\} \qquad \text{Eq. (71)}$$

are the autocorrelation matrix and the crosscorrelation vector of the filtered reference sequence. The convergence condition for the MBAA is $$0 < \tilde{\mu}_B < \frac{1}{\tilde{\lambda}_{max}} \qquad \text{Eq. (72)}$$

where $\tilde{\lambda}_{max}$ is the largest eigenvalue of the autocorrelation matrix $\tilde{r}$.

As with the single channel case, in accordance with one aspect of the present invention, a variable convergence factor for the MBAA is preferably employed. As previously noted, the convergence factor determines the stability, controls the convergence speed, and affects the adaptation accuracy of the algorithm. In accordance with one aspect of the invention, proper selection of the convergence factor is thus highly desirable. The commonly used adaptive algorithms for active noise control, such as the filtered-X LMS algorithm or multichannel LMS algorithm are sequential algorithms with a fixed convergence factor. As noted previously, the selection of the convergence factor is primarily based on "trial and error" which is often time consuming.

The X-0BLMS algorithm employing a variable convergence factor was presented above for use in single channel applications. A similar technique may suitably be applied to the MBAA. An MBAA with a variable (e.g. time-varying) convergence factor is referred to as the multi-channel optimal block adaptive algorithm (MOBAA) method. The term "optimal" is used in the sense that the convergence factor is adapted such that the cost function of the MBAA is reduced (e.g. minimized) at each iteration.

The MOBAA improves the performance of the MBAA, since, for example, a) a convergence factor is determined automatically by the algorithm, i.e., no "trial and error" process is necessary, b) faster convergence characteristics are observed due to the fact that the convergence factor is designed to minimize the cost function from one iteration to the next, and c) better tracking capability is obtained for non-stationary signals. Additional computation, however, may be required to calculate the convergence factor.

Based on a control scheme analogous to the MBAA, the update equation of the MOBAA is given by $$\underline{w}_{j+1} = \underline{w}_j - 2\left(\frac{\tilde{\mu}_j^B}{L}\right)\tilde{\underline{r}}_j^T \underline{e}_j \qquad \text{Eq. (73)}$$

where $\tilde{\mu}_j^B$ is the time-varying convergence factor. In order to derive the optimal $\tilde{\mu}_j^B$, the Taylor series expansion technique is applied again for the multichannel error functions. Since the data structure may be more complex than the single-channel case, a detailed derivation is given in the following.

For convenience, the total block error, the desired signal vectors, and the filtered reference matrix at the $(j+1)^{th}$ block are rewritten below $$\underline{e}_{j+1} = \begin{bmatrix} \underline{e}_{1,j+1} \\ \underline{e}_{2,j+1} \\ \vdots \\ \underline{e}_{m,j+1} \\ \vdots \\ \underline{e}_{M,j+1} \end{bmatrix}, \underline{d}_{j+1} = \begin{bmatrix} \underline{d}_{1,j+1} \\ \underline{d}_{2,j+1} \\ \vdots \\ \underline{d}_{m,j+1} \\ \vdots \\ \underline{d}_{M,j+1} \end{bmatrix}, \tilde{\underline{r}}_{j+1} = \begin{bmatrix} \underline{r}_{1,j+1} \\ \underline{r}_{2,j+1} \\ \vdots \\ \underline{r}_{m,j+1} \\ \vdots \\ \underline{r}_{M,j+1} \end{bmatrix} \qquad \text{Eq. (74)}$$

and $$\begin{bmatrix} \underline{e}_{1,j+1} \\ \underline{e}_{2,j+1} \\ \vdots \\ \underline{e}_{m,j+1} \\ \vdots \\ \underline{e}_{M,j+1} \end{bmatrix} = \begin{bmatrix} \underline{d}_{1,j+1} \\ \underline{d}_{2,j+1} \\ \vdots \\ \underline{d}_{m,j+1} \\ \vdots \\ \underline{d}_{M,j+1} \end{bmatrix} + \begin{bmatrix} \underline{r}_{1,j+1} \\ \underline{r}_{2,j+1} \\ \vdots \\ \underline{r}_{m,j+1} \\ \vdots \\ \underline{r}_{M,j+1} \end{bmatrix} \begin{bmatrix} w_{j+1}(0) \\ w_{j+1}(1) \\ \vdots \\ w_{j+1}(i) \\ \vdots \\ w_{j+1}(NI-1) \end{bmatrix} \qquad \text{Eq. (75)}$$

where the index for the entries in $w_{j+1}$ has been rearranged for clarity. Consider the error function expression associated with the $m^{th}$ error sensor, i.e., $$\underline{e}_{m,j+1} = \underline{d}_{m,j+1} + \underline{r}_{m,j+1}\underline{w}_{j+1} \qquad \text{Eq. (76)}$$

the $l^{th}$ entry of the $e_{m,j+1}$ can be expressed as $$e_{m,j+1}(l) = d_{m,j+1}(l) + \{\text{the } l^{th} \text{ row of } \underline{r}_{m,j+1}\}\underline{w}_{j+1} \quad l=1,2,\ldots,L \quad \text{Eq. (77)}$$

The error function $e_{m,j+1}(l)$ in Eq. (77) can be expanded in terms of the error function $e_{m,j}(l)$ using the Taylor series expansion, i.e., $$e_{m,j+1}(l) = e_{m,j}(l) + \sum_{i=0}^{NI-1} \frac{\partial e_{m,j}(l)}{\partial w_j(i)} \delta w_j(i) + \frac{1}{2!} \sum_{i=0}^{NI-1} \sum_{i'=0}^{NI-1} \frac{\partial^2 e_{m,j}(l)}{\partial w_j(i) \partial w_j(i')} \delta w_j(i) \delta w_j(i') + \text{HOT} \quad \text{Eq. (78)}$$

$l = 1,2,\ldots,L$ where $$\delta w_j(i) = w_{j+1}(i) - w_j(i) \quad i=0,1,\ldots,NI-1$$
$$\delta w_j(i') = w_{j+1}(i') - w_j(i') \quad i'=0,1,\ldots,NI-1 \quad \text{Eq. (79)}$$

and the "HOT" stands for the higher order terms of the Taylor series expansion. Since the error is a linear function of the filter coefficients, any terms higher than the first order in the Taylor series expansion are zero. Eq. (78) then becomes $$e_{m,j+1}(l) = e_{m,j}(l) + \sum_{i=0}^{NI-1} \frac{\partial e_{m,j}(l)}{\partial w_j(i)} \delta w_j(i) \quad \text{Eq. (80)}$$

Eq. (80) or a similar function may be applied to each entry of the vector $e_{m,j+1}$, and yielding the vector form expression $$\underline{e}_{m,j+1} = \underline{e}_{m,j} + \frac{\partial \underline{e}_{m,j}}{\partial \underline{W}_j} \delta \underline{W}_j \quad \text{Eq. (81)}$$

where $$\frac{\partial \underline{e}_{m,j}}{\partial \underline{W}_j} = \begin{bmatrix} \frac{\partial e_{m,j}(1)}{\partial w_j(0)} & \frac{\partial e_{m,j}(1)}{\partial w_j(1)} & \cdots & \frac{\partial e_{m,j}(1)}{\partial w_j(NI-1)} \\ \frac{\partial e_{m,j}(2)}{\partial w_j(0)} & \frac{\partial e_{m,j}(2)}{\partial w_j(1)} & \cdots & \frac{\partial e_{m,j}(2)}{\partial w_j(NI-1)} \\ \vdots & \vdots & & \vdots \\ \frac{\partial e_{m,j}(L)}{\partial w_j(0)} & \frac{\partial e_{m,j}(L)}{\partial w_j(1)} & \cdots & \frac{\partial e_{m,j}(L)}{\partial w_j(NI-1)} \end{bmatrix} \quad \text{Eq. (82)}$$

Following the same procedure for the error vector at each input channel, define $$\frac{\partial \underline{e}_j}{\partial \underline{w}_j} = \begin{bmatrix} \frac{\partial \underline{e}_{1,j}^T}{\partial \underline{w}_j} & \frac{\partial \underline{e}_{2,j}^T}{\partial \underline{w}_j} & \cdots & \frac{\partial \underline{e}_{m,j}^T}{\partial \underline{w}_j} & \cdots & \frac{\partial \underline{e}_{M,j}^T}{\partial \underline{w}_j} \end{bmatrix}^T \quad \text{Eq. (83)}$$

where $\partial \underline{e}_j / \partial \underline{w}_j$ is an $(ML)\times(NI)$ differential matrix and the total error vector at the $(j+1)^{th}$ block can be expressed as $$\underline{e}_{j+1} = \underline{e}_j + \frac{\partial \underline{e}_j}{\partial \underline{w}_j} \delta \underline{w}_j \quad \text{Eq. (84)}$$

where $$\delta \underline{w}_j = \underline{w}_{j+1} - \underline{w}_j = -\frac{2}{L} \widetilde{\mu}_j^B \widetilde{r}_j^T \underline{e}_j \quad \text{Eq. (85)}$$

Substituting Eq. (85) to Eq. (84) yields:

$$\underline{e}_{j+1} = \underline{e}_j - \frac{2}{L} \widetilde{\mu}_j^B \frac{\partial \underline{e}_j}{\partial \underline{w}_j} \widetilde{r}_j^T \underline{e}_j \quad \text{Eq. (86)}$$

$$= \underline{e}_j - \frac{2}{L} \widetilde{\mu}_j^B \widetilde{B}_j \widetilde{r}_j^T \underline{e}_j$$

The cost function to be minimized at the $(j+1)^{th}$ block is defined as $$\hat{J}_B(j+1) = \frac{1}{L} [\underline{e}_{j+1}^T \underline{e}_{j+1}] \quad \text{Eq. (87)}$$

The optimal convergence factor $\mu^B_j$ may then be obtained by minimizing the $J_B(j+1)$. Substituting Eq. (86) into Eq. (87) yields:

$$\hat{J}_B(j+1) = \frac{1}{L} \left[ \underline{e}_j - \frac{2}{L} \widetilde{\mu}_j^B \widetilde{r}_j^T \underline{e}_j \right]^T \left[ \underline{e}_j - \frac{2}{L} \widetilde{\mu}_j^B \widetilde{r}_j^T \underline{e}_j \right] \quad \text{Eq. (88)}$$

$$= \frac{1}{L} \left[ \underline{e}_j^T \underline{e}_j - \frac{2}{L} \widetilde{\mu}_j^B \underline{e}_j^T \widetilde{r}_j \widetilde{r}_j^T \underline{e}_j - \frac{2}{L} \widetilde{\mu}_j^B \underline{e}_j^T \widetilde{r}_j \widetilde{r}_j^T \underline{e}_j + \frac{4}{L^2} \widetilde{\mu}_j^{B2} \underline{e}_j^T \widetilde{r}_j \widetilde{r}_j^T \widetilde{r}_j \widetilde{r}_j^T \underline{e}_j \right]$$

Taking the gradient of the cost function $J_B(j+1)$ w.r.t the convergence factor $\mu^B_j$ and setting it to zero, i.e.

$$\frac{1}{L} \frac{\partial [\underline{e}_{j+1}^T \underline{e}_{j+1}]}{\partial \widetilde{\mu}_j^B} = 0 \quad \text{Eq. (89)}$$

then the optimal convergence factor which minimizes the cost function is given by $$\widetilde{\mu}_j^B = \frac{L}{2} \frac{\alpha \underline{e}_j^T \widetilde{r}_j \widetilde{r}_j^T \underline{e}_j}{\underline{e}_j^T \widetilde{r}_j \widetilde{r}_j^T \widetilde{r}_j \widetilde{r}_j^T \underline{e}_j} = \frac{L}{2} \frac{\alpha \hat{\nabla}_j^{BT} \hat{\nabla}_j^B}{\hat{\nabla}_j^{BT} \widetilde{r}_j^T \widetilde{r}_j \hat{\nabla}_j^B} \quad \text{Eq. (90)}$$

The time-varying convergence factor, $\mu^B_j$, of the multichannel block adaptive algorithm provides for fast convergence by minimizing the cost function at each iteration. As demonstrated in the single-channel X-OBLMS, the convergence speed improves considerably. The $\mu^B_j$, however, may be large and varied rapidly from one iteration to another, especially during transients. This may increase misadjustment and cause some transient effect due to possible rapid changes of sound intensity. To improve misadjustment and reduce the transient effect, a scaling factor $\alpha$ is suitably introduced and can be chosen to be in the range of $0 < \alpha < 1$.

Both block-by-block and sample-by-sample updating schemes can be implemented with the MOBAA. The MOBAA with sample-by-sample update achieves faster convergence speed at the expense of additional computation. A faster convergence speed is observed by block overlapping. The fastest convergence is achieved by using sample-by-sample update with a high level of block overlapping.

The implementation complexity of multichannel block adaptive algorithms is evaluated in terms of real multiplications and real additions. The complexity is appropriately computed for each block of outputs and is based on the block-by-block update scheme.

Table 3 shows that the MLMS and the MBAA have the same complexity when operating on L samples of data. Some additional computations may be required for the MOBAA for computing the convergence factor. For the sample-by-sample updates, more computations are generally required per sample for both the MBAA and the MOBAA.

TABLE 3

Computational Complexity of Multichannel Algorithms

| Algorithms | Real Multiplies | Real Adds |
| --- | --- | --- |
| MLMS | 3NMIL + NI | 3NMIL − NML − ML |
| MBAA | 3NMIL + NI | 3NMIL − NML − ML |
| OMBAA | 4NMIL + 2NI + ML | 4NMIL + NI − NML − ML |

As noted previously, frequency domain algorithms generally have at least two attractive features. First, the frequency domain adaptive algorithms enable control of individual frequency components of sound and, therefore, control of the convergence speed of the different modes. This feature is particularly useful when the input is associated with an autocorrelation matrix that has large eigenvalue spread. Second, the complexity of the algorithms can be potentially reduced for high order filter implementations because, inter alia, the convolution and correlation operations involved in the block gradient estimation are performed efficiently using the FFT.

For multichannel active noise control, the complexity is proportional to the square of the number of channels. Thus, the efficiency of the algorithm is therefore an important issue when the number of the channels increases. The frequency domain adaptive algorithms can also be adapted on, e.g., a sample-by-sample or block-by-block basis.

Frequency domain adaptive algorithms may be suitably implemented in multichannel applications with or without gradient constraints. The frequency domain multichannel adaptive algorithm (circular convolution) (FMAAC) described below is suitably implemented without the gradient constraint since the underlying convolutions and the correlations are circular. By removing the constraint, a number of FFT (IFFT) operations may be eliminated. The complexity of the algorithm may therefore be further reduced.

Figure 8:
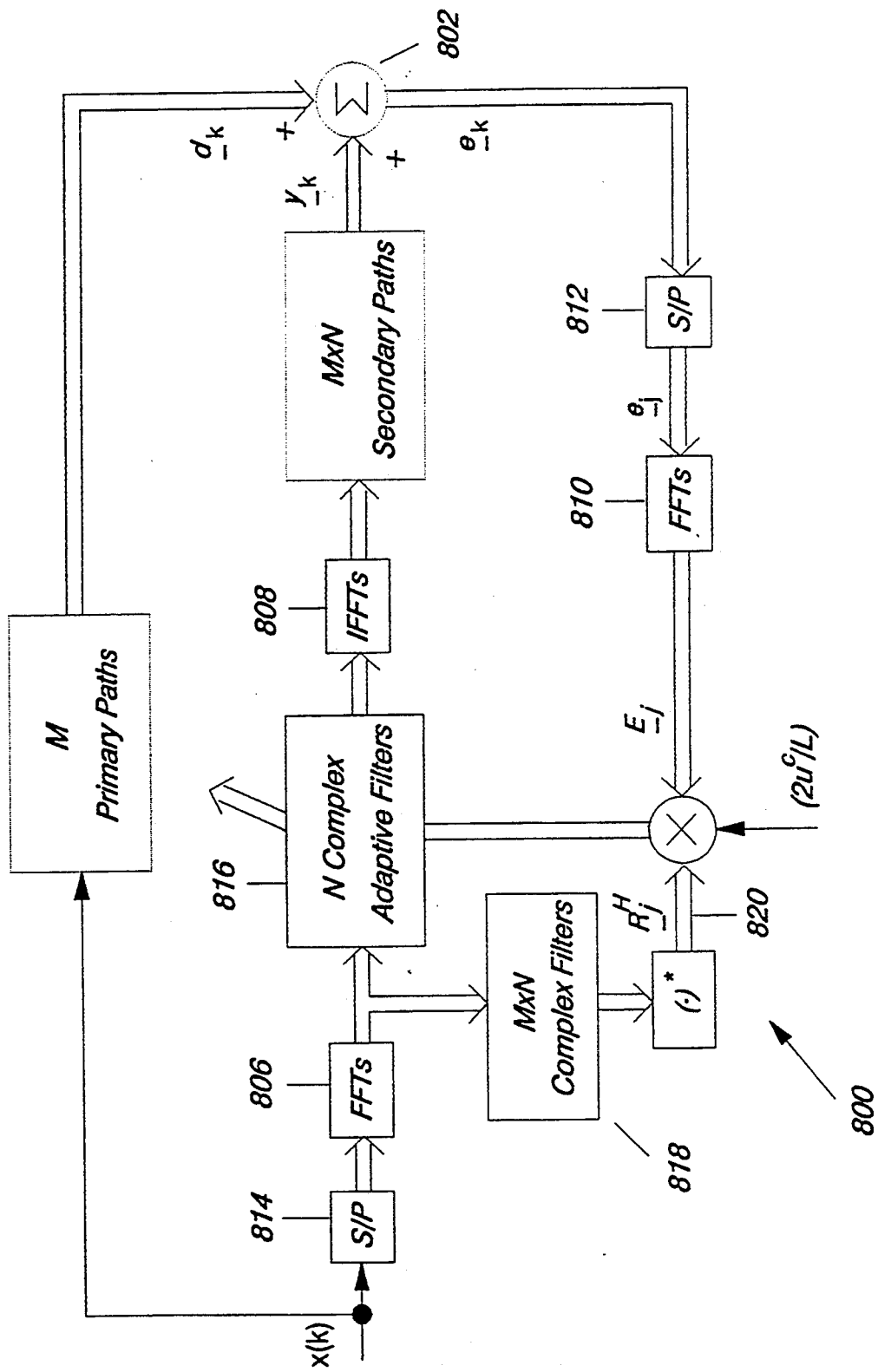
FIG. 8 illustrates a block diagram for the frequency domain (circular convolution) multichannel adaptive algorithm.

Returning now to FIG. 8, a frequency domain (circular convolution) multichannel adaptive system 800 suitably includes respective fast Fourier transform (FFT) circuits 806 and 810, an inverse fast Fourier transform circuit 808, respective serial to parallel circuits 814 and 812, N complex adaptive filters 816, M×N complex filter 818, respective summers 802, and a processor 820 where M is the number of error sensors 802 and N is the number of actuators driven by the N complex adaptive filter 816.

The input signal x(k) suitably follows M primary paths to be a derived signal of d(k) at each of M summers 802. The input signal x(k) is also applied to serial to parallel converter 814 to convert from a sequential format to a block format. The block format input signal x(k) is then applied to fast Fourier transform circuit 806.

The block and transformed input signal x(k) is fed into the N complex adaptive filters 816 to generate N output signals y(k). The N output signals are applied to inverse fast Fourier transform circuit 808 and a parallel to serial circuit (not shown) before following M×N paths to each of M summers 802.

In addition, the block and transformed input signals x(k) is also applied to M×N complex filter 818 to generate filtered-X structure $R_j^H$. The filtered-X structure $R_j^H$ is then applied to processor 820.

Each of the M summers 802 relays the error signal $e_k$, i.e. the summation of $d_k$ and $y_k$, to a serial to parallel circuit 812 and hence to fast Fourier transform circuit 810. The summers 802 are preferably an acoustic summer such as a microphone. From fast Fourier transform 810, the error signal $e_k$ is applied to processor 820.

Processor 820 applies the algorithm described below to correct the coefficients comprising N complex adaptive filter 816 as appropriate.

The FMAAC algorithm is suitably formulated in the following manner. The time-domain input signal x(k) is formed as an L×I vector, $$\underline{x_j} = [X(js)\ x(js+1)\ \ldots\ x(js+L-1)]^T \quad \text{Eq. (91)}$$

The time-domain error signal $e_k$ and the desired signal $d_k$ vectors at the $m^{-th}$ error sensor are given by $$\underline{e_{m,j}} = [e_m(js)\ e_m(js+1)\ \ldots\ e_m(js+L-1)]^T \quad \text{Eq. (92)}$$

and $$\underline{d_{m,j}} = [d_m(js)\ d_m(js+1)\ \ldots\ d_m(js+L-1)]^T \quad \text{Eq. (93)}$$

where j is a block index and the block length L is a radix-2 integer. The FIR coefficient vector found in the M×N complex filter 818 which models the transfer function between the $m^{-th}$ error sensor and the $n^{-th}$ actuator is given by $$\underline{h_{m,n}^s} = [h_{m,n}^s(0)\ h_{m,n}^s(1)\ \ldots\ h_{m,n}^s(L-1)]^T \quad \text{Eq. (94)}$$

Here the filter taps are desirably chosen to be the same as the block length. An FFT operation 806 is performed on the input signal vector $x_j$, and the secondary filter coefficients, $h_{m,n}^s$, i.e., $$\underline{X_j} = \text{diag}\{FFT[x_j]\} \quad \text{Eq. (95)}$$

and $$\underline{H_{m,n}^s} = \text{diag}\{FFT[h_{m,n}^s]\} \quad \text{Eq. (96)}$$

where $X_j$ and $H_{m,n}^s$ are L×L complex diagonal matrices. Also define the L×1 complex adaptive coefficient vector found in the N complex adaptive filter 816 for the $n^{-th}$ output channel, $$\underline{w_{n,j}^c} = [W_{n,j}^c(0)\ W_{n,j}^c(1)\ \ldots\ W_{n,j}^c(L-1)]^T\ n=1,2,\ldots N \quad \text{Eq. (97)}$$

The frequency domain output vector $Y_k$ at the $m^{-th}$ error sensor may then be given by $$\underline{Y_{m,j}} = \sum_{n=1}^{N} \underline{R_{m,n,j}^c} \underline{w_{n,j}^c} \quad \text{Eq. (98)}$$

where the L×L complex filtered reference matrix between the m-$^{th}$ input and the n-$^{th}$ output, $R^c_{m,n,j}$, is given by $$\underline{R}_{m,n,j}^c = \underline{X}_j \underline{H}_{m,n}^s \qquad \text{Eq. (99)}$$

The time-domain secondary output observed by the m-$^{th}$ sensor is the inverse Fourier transform 808 $Y_{m,j}$, i.e., $$\underline{y}_{m,j} = \text{IFFT}\{\underline{Y}_{m,j}\} \qquad \text{Eq. (100)}$$

The error vector $e_k$ at the m-$^{th}$ sensor is then given by $$\underline{e}_{m,j} = \underline{d}_{m,j} + \underline{y}_{m,j} \qquad \text{Eq. (101)}$$

The FFT operation 810 of $e_{m,j}$ yields the frequency domain error vector, i.e., $$\underline{E}_{m,j} = \text{FFT}\{\underline{e}_{m,j}\} \qquad \text{Eq. (102)}$$

The total frequency domain block error for all the error sensors is formed in processor 820, for example, as an (ML)×1 complex vector, $$\underline{E}_j = [\underline{E}_{1,j}^T \underline{E}_{2,j}^T \ldots \underline{E}_{M,j}^T]^T 8 \qquad \text{Eq. (103)}$$

Similarly, an (ML)×1 complex desired signal vector can be formed in processor 820, for example, as $$\underline{D}_j = [\underline{D}_{1,j}^T \underline{D}_{2,j}^T \ldots \underline{D}_{M,j}^T]^T \qquad \text{Eq. (104)}$$

where $$\underline{D}_{m,j} = \text{FFT}\{\underline{d}_{m,j}\} \qquad \text{Eq. (105)}$$

is an L×1 complex desired signal vector at the m-$^{th}$ sensor. In addition, define an (NL)×1 complex coefficient vector $$\underline{W}_j^c = [\underline{W}_{1,j}^{cT} \underline{W}_{2,j}^{cT} \ldots \underline{W}_{N,j}^{cT}]^T \qquad \text{Eq. (106)}$$

and $$\underline{R}_j^c = \begin{bmatrix} \underline{R}_{1,1,j}^c & \underline{R}_{1,2,j}^c & \cdots & \underline{R}_{1,N,j}^c \\ \underline{R}_{2,1,j}^c & \underline{R}_{2,2,j}^c & \cdots & \underline{R}_{2,N,j}^c \\ \vdots & \vdots & & \vdots \\ \underline{R}_{M,1,j}^c & \underline{R}_{M,2,j}^c & \cdots & \underline{R}_{M,N,j}^c \end{bmatrix} \qquad \text{Eq. (107)}$$

where $R_j^c$ is an (ML)×(NL) complex filtered-reference matrix with a block diagonal structure. The complex error vector is then given by $$\underline{E}_j = \underline{D}_j + \underline{R}_j^c \underline{W}_j^c \qquad \text{Eq. (108)}$$

The cost function in the processor 820 of the FMAAC is defined as the frequency domain block mean squared error, i.e., $$J_B = \frac{1}{L} E\{\underline{E}_j^H \underline{E}_j\} = \frac{1}{L} E\{[\underline{D}_j + \underline{R}_j^c \underline{W}_j^c]^H [\underline{D}_j + \underline{R}_j^c \underline{W}_j^c]\} \qquad \text{Eq. (109)}$$

Taking the gradient of the cost function $J_B$ with respect to the real and the imaginary parts of $W_j^c$ respectively and combine them:

$$\underline{\nabla}_j^c = \frac{\partial J_B}{\partial \underline{W}_j^c} = \frac{1}{L} E[2\underline{R}_j^{cH} \underline{D}_j + 2\underline{R}_j^{cH} \underline{R}_j^c \underline{W}_j^c] \qquad \text{Eq. (110)}$$

Using the gradient estimation, $$\hat{\underline{\nabla}}_j^c = \frac{2}{L} \underline{R}_j^{cH} \underline{E}_j \qquad \text{Eq. (111)}$$

the update equation of the FMAAC is obtained by $$\underline{W}_{j+1}^c = \underline{W}_j^c - \mu^c \hat{\underline{\nabla}}_j^c \qquad \text{Eq. (112)}$$
$$= \underline{W}_j^c - \frac{2\mu^c}{L} \underline{R}_j^{cH} \underline{E}_j$$

It should be noted that, although the FMAAC may be configured to minimize the frequency domain cost function, the error is actually formed in the time-domain and transformed to the frequency domain. Since the circular convolution operations are involved in the algorithm formulation, the FMAAC typically need not converge to the same optimal solution as the MBAA. It can be shown that an optimal solution of the FMAAC is given by $$\underline{W}^o = -\underline{R}_p^{c-1} \underline{p}^c \qquad \text{Eq. (113)}$$

where $$\underline{R}_p^c = \frac{1}{L} E\{\underline{R}_j^{cH} \underline{R}_j^c\} \qquad \text{Eq. (114)}$$

and $$\underline{p}^c = \frac{1}{L} E\{\underline{R}_j^{cH} \underline{D}_j\} \qquad \text{Eq. (115)}$$

are the power spectral matrix and the cross-spectral vector of the filtered input signal. The algorithm converges in the mean to the optimal solution if the convergence factor is bounded by $$0 < \mu^c < \frac{1}{\Lambda_{max}^c} \qquad \text{Eq. (116)}$$

where $\Lambda_{max}^c$ is the maximum eigenvalue of the power spectral matrix $R_p^c$.

In addition, for reasons previously stated, an optimal time-varying convergence factor can also be derived for the FMAAC to minimize the frequency domain cost function at each iteration. The FMAAC with an optimal time-varying convergence factor is referred to as the frequency domain multichannel optimal adaptive algorithm (FMOAAC). Following a similar derivation as with the MOBAA, the 1-$^{th}$ entry of the error vector $E_{m,j+1}$ can be expressed in terms of the 1-$^{th}$ entry of the error vector of $E_{m,j}$ by Taylor's series expansion in processor 820

$$E_{m,j+1}(l) = E_{m,j}(l) + \sum_{i=0}^{NL-1} \frac{\partial E_{m,j}(l)}{\partial W_j^c(i)} + \qquad \text{Eq. (117)}$$

$$\frac{1}{2!} \sum_{i=0}^{NL-1} \sum_{i'=0}^{NL-1} \frac{\partial E_{m,j}(l)}{\partial W_j^c(i) \partial W_j^c(i')} \delta W_m^c(i) \delta W_j^c(i') +$$

HOT $l = 1, 2, \ldots, L$

Since the frequency domain error is a linear function of the coefficient vector, the higher order terms over one are zeros. Eq. (117) becomes $$E_{m,j+1}(l) = E_{m,j}(l) + \sum_{i=0}^{NL-1} \frac{\partial E_{m,j}(l)}{\partial W_j^c(i)} \delta W_j^c(i) \qquad \text{Eq. (118)}$$

Applying Eq. (118) to each entry of the error vector and combining them in a vector form:

$$\underline{E}_{j+1} = \underline{E}_j + \frac{\partial \underline{E}_j}{\partial \underline{W}_j^c} \delta \underline{W}_j^c \qquad \text{Eq. (119)}$$

From Eq. (119) and Eq. (118):

$$\underline{E}_{j+1} = \underline{E}_j - \mu_j^c R_j^c \hat{\underline{\nabla}}_j^c \qquad \text{Eq. (120)}$$

where $$\hat{\underline{\nabla}}_j^c = \frac{2}{L} \mu_j^c R_j^{cH} \underline{E}_j \qquad \text{Eq. (121)}$$

The cost function at the $j+1\text{-}th$ block is given by $$\hat{J}_B(j+1) = \frac{1}{L}[\underline{E}_{j+1}^H \underline{E}_{j+1}] \qquad \text{Eq. (122)}$$

$$= \frac{1}{L}[\underline{E}_j - \mu_j^c R_j^c \hat{\underline{\nabla}}_j^c]^H [\underline{E}_j - \mu_j^c R_j^c \hat{\underline{\nabla}}_j^c]$$

Taking the gradient of the cost function $J_B(j+1)$ w.r.t. $\mu^c_j$ and set it to zero, i.e., $$\frac{\partial \hat{J}_B(j+1)}{\partial \mu_j^c} = \frac{1}{L} \frac{\partial [\underline{E}_{j+1}^H \underline{E}_{j+1}]}{\partial \mu_j^c} = 0 \qquad \text{Eq. (123)}$$

the time-varying convergence factor is obtained by $$\mu_j^c = \frac{L}{2} \frac{\alpha \hat{\underline{\nabla}}_j^{cH} \hat{\underline{\nabla}}_j^c}{\hat{\underline{\nabla}}_j^{cH} R_j^{cH} R_j^c \hat{\underline{\nabla}}_j^c} \qquad \text{Eq. (124)}$$

where $0 < \alpha \leq 1$ controls the misadjustment of the algorithm. By using a time-varying convergence factor, the frequency domain error energy is may be reduced (e.g. minimized) from one iteration to the next. The convergence speed is therefore improved considerably.

In an alternate embodiment, normalized convergence factors can be adopted for the FMAAC. The FMAAC with normalized convergence factor is referred to as the FMNAAC. In some situations, normalized convergence factors are desirable. A normalized convergence factor takes advantage of the frequency domain algorithm to determine individual fixed convergence factors for separate frequencies. When the input signal x(k) is harmonically structured, the normalized convergence factor alters fast convergence without the computational needs of the optimal convergence factor. More particularly, let $$M_j^c = [R_j^{cH} R_j^c] \qquad \text{Eq. (125)}$$

where $0 < \alpha \leq 1$ is a scaling factor. Different convergence factors are suitably assigned to each different frequency component for achieving a more uniformed convergence rate. The update equation of the FMNAAC may be given by $$\underline{W}_{j+1}^c = \underline{W}_j^c - \alpha M_j^{c-1} \hat{\underline{\nabla}}_{E}^c \qquad \text{Eq. (126)}$$

It is noted that the computation of the normalized convergence factors involves the inverse operation of the $R_j^{cH} R_j^c$. It is a simple matter to compute the inverse in the single-channel algorithm where the matrix $R_j^{cH} R_j^c$ is diagonal. In the multichannel algorithm, the sample power spectral matrix, $R_j^{cH} R_j^c$ may be of a block diagonal structure and hence, more difficult to invert. One should also consider the condition of the matrix to avoid numerical errors.

Similar to the MBAA and the MOBAA, the FMAAC and the FMOAAC can be updated with different updating schemes. The updating schemes are also specified by, inter alia, the block shift s.

The FMAA represents the linear convolution of the MBAA in the frequency domain. The FMAA may thus require more computations than the FMAAC due to, inter alia, the gradient constraints.

Figure 9:
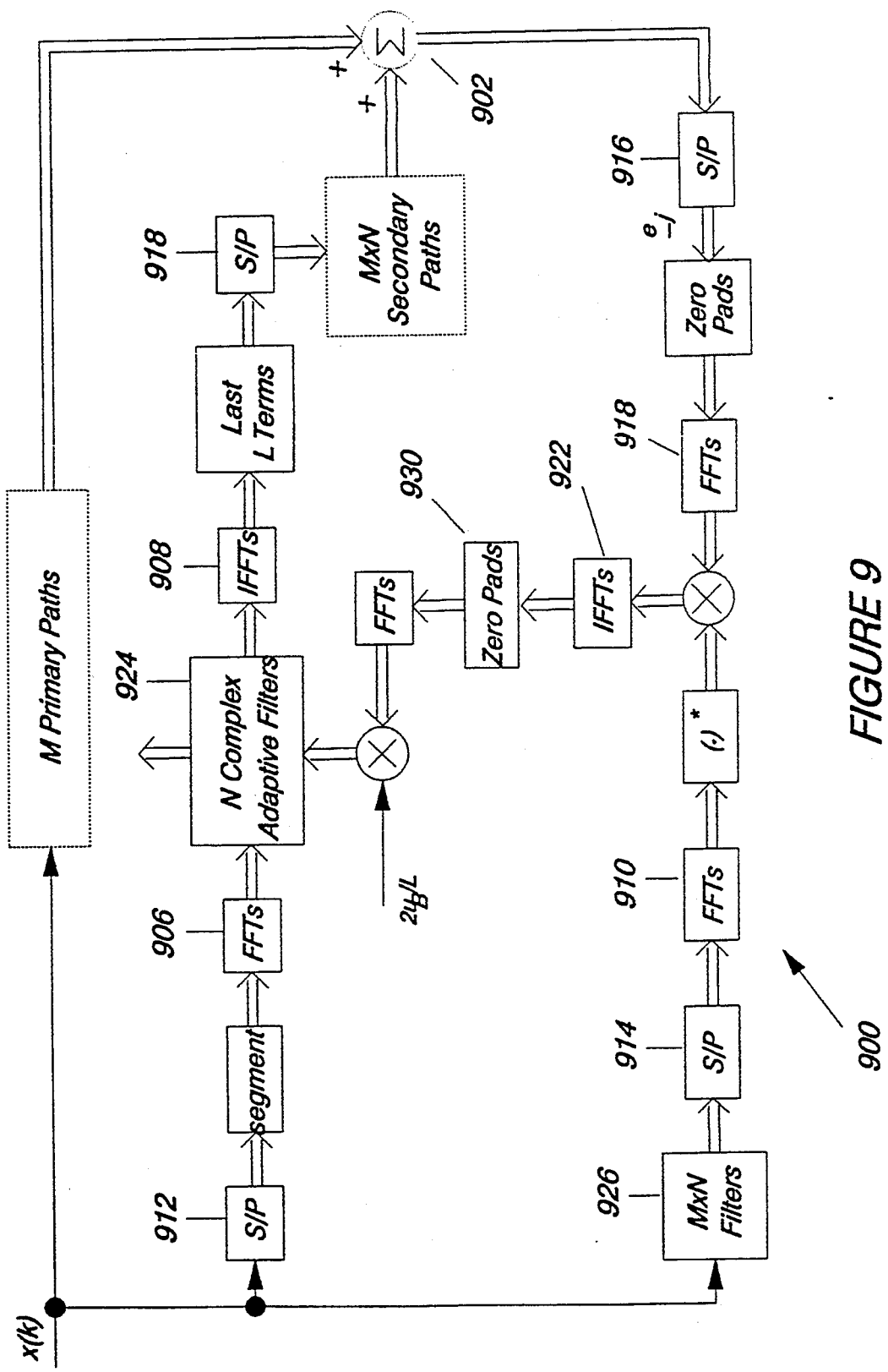
FIG. 9 illustrates a block diagram for the frequency domain (linear convolution) multichannel adaptive algorithm.

Referring now to FIG. 9, a block diagram of the frequency domain (linear convolution) adaptive algorithm system 900 suitably includes respective serial to parallel circuits 912, 914 and 916, a parallel to serial circuit 918, respective fast Fourier transform circuits 906, 910, 918, 920, respective inverse fast Fourier transform circuits 908 and 922, N complex adaptive filters 924, and M×N filters 926. As noted previously, in a linear convolution scheme, the fast Fourier transform 910 may be beneficially disposed to cooperate with the output if placed after the M×N filters 926.

The FMAA is suitably formulated as follows. First, define the FFT components of the 2L×1 vectors, $$\tilde{\underline{r}}_{m,n,j} = [r_{m,n}(js-L) \; r_{m,n}(js-L+1) \ldots r_{m,n}(js-1) \\ r_{m,n}(js) \; r_{m,n}(js+1) \ldots r_{m,n}(js+L-1)]^T \qquad \text{Eq. (127)}$$

which is of two L-point filtered reference vectors for the path between the $m\text{-}th$ sensor and the $n\text{-}th$ actuator. The FFT components, $\{R_{m,n}(i), i=0,1 \ldots 2L-1\}$ form an 2L×2L diagonal matrix.

$$\tilde{R}_{m,n,j} = diag[\tilde{R}_{m,n}(1) \; \tilde{R}_{m,n}(2) \ldots \tilde{R}_{m,n}(2L-1)] \qquad \text{Eq. (128)}$$

The frequency domain output observed by the $m\text{-}th$ error sensor is given by $$\underline{Y}_{m,j} = \sum_{n=1}^{N} \tilde{R}_{m,n,j} \underline{W}_{n,j} \qquad \text{Eq. (129)}$$

where $W_{n,j}$ is an 2L×1 complex vector containing the frequency domain coefficients of the $n\text{-}th$ adaptive filter. According to the overlap-and-save method for fast convolution, the last L terms of the inverse FFT of $Y_{m,j}$ are results of a proper linear convolution, and hence a zero pad operation is performed and:

$$\underline{y}_{m,j} = [\text{last L terms of IFFT}\{\underline{Y}_{m,j}\}] \qquad \text{Eq. (130)}$$

The error vector at the $m\text{-}th$ sensor is $$\underline{e}_{m,j} = \underline{d}_{m,j} + \underline{y}_{m,j} \qquad \text{Eq. (131)}$$

and the frequency domain error at the $m\text{-}th$ sensor is given by $$\underline{E}_{m,j} = FFT\{[\underline{0}^T \; \underline{e}_{m,j}^T]^T\} \; m=1,2,\ldots,M \qquad \text{Eq. (132)}$$

The total frequency domain error vector $e_j$ is formed as $$\underline{\tilde{E}}_j = [\underline{E}_{1,j}{}^T \underline{E}_{2,j}{}^T \ldots \underline{E}_{m,j}{}^T \ldots \underline{E}_{M,j}{}^T]^T \qquad \text{Eq. (133)}$$

and the filter coefficient vector is given by $$\underline{W}_j = [\underline{W}_{1,j}{}^T \underline{W}_{2,j}{}^T \ldots \underline{W}_{n,j}{}^T \ldots \underline{W}_{N,j}{}^T]^T \qquad \text{Eq. (134)}$$

The frequency domain gradient for the n-th adaptive filter is obtained by $$\underline{G}_{n,j} = \sum_{m=1}^{M} \underline{\tilde{R}}^H_{m,n,j} \underline{E}_{m,j} \qquad \text{Eq. (135)}$$

The gradient is then constrained via zero pad 930, i.e., $$\hat{\underline{\nabla}}_{n,j}{}^B = [\text{first } L \text{ terms of IFFT}\{\underline{G}_{n,j}\}] \qquad \text{Eq. (136)}$$

and $$\underline{\tilde{G}}_{n,j} = \text{FFT}\{[(\hat{\underline{\nabla}}_{n,j}{}^B)^T \underline{0}^T]^T\} \qquad \text{Eq. (137)}$$

Define $$\hat{\underline{\nabla}}_j{}^B = [\hat{\underline{\nabla}}_{1,j}{}^{BT} \hat{\underline{\nabla}}_{1,j}{}^{BT} \ldots \hat{\underline{\nabla}}_{N,j}{}^{BT}]^T \qquad \text{Eq. (138)}$$

and $$\hat{\underline{G}}_j = [\hat{\underline{G}}_{1,j}{}^T \hat{\underline{G}}_{2,j}{}^T \ldots \hat{\underline{G}}_{N,j}{}^T]^T \qquad \text{Eq. (139)}$$

Finally, the update equation of the FMAA is given by $$\underline{W}_{j+1} = \underline{W}_j - \frac{2}{L} \tilde{\mu}_B \hat{\underline{G}}_j \qquad \text{Eq. (140)}$$

Since the FMAA is essentially an exact implementation of the MBAA, it converges to the same optimal solution as the MBAA. The conditions of convergence of the FMAA are given by Eq. (69).

Optimal time-varying convergence factors can also be computed efficiently in the frequency domain for the FMAA. The FMAA with a time-varying convergence factor is called the frequency domain multichannel optimal adaptive algorithm (FMOAA). Recall that the convergence factor of the MOBAA was given in Eq. (124), $$\tilde{\mu}_j{}^B = \frac{L}{2} \frac{\alpha \hat{\underline{\nabla}}_j{}^{BT} \hat{\underline{\nabla}}_j{}^B}{2 \hat{\underline{\nabla}}_j{}^{BT} \tilde{r}_j \tilde{r}_j \hat{\underline{\nabla}}_j{}^B} = \frac{L}{2} \frac{\alpha \hat{\underline{\nabla}}_j{}^{BT} \hat{\underline{\nabla}}_j{}^B}{\hat{\underline{g}}_j{}^T \hat{\underline{g}}_j} \qquad \text{Eq. (141)}$$

where $\hat{\underline{g}}_j = \tilde{r}_j \hat{\underline{\nabla}}_j{}^B$. The numerator of the expression of $\tilde{\mu}_j{}^B$ is the product of the gradient estimate which may be computed in accordance with Eq. (138). The denominator of the expression is actually the inner product of $\hat{\underline{g}}_j$ which can be computed efficiently in the frequency domain. Define $$\hat{\underline{g}}_j = [\hat{\underline{g}}_{1,j}{}^T \hat{\underline{g}}_{2,j}{}^T \ldots \hat{\underline{g}}_{n,j}{}^T \ldots \hat{\underline{g}}_{N,j}{}^T]^T \qquad \text{Eq. (142)}$$

Each sub-vector of the $g_j$ can be obtained by $$\hat{\underline{g}}_{n,j} = \left[ \text{the last } L \text{ terms of IFFT} \sum_{m=1}^{M} \underline{\tilde{R}}_{m,n,j} \hat{\underline{G}}_{n,j} \right] \qquad \text{Eq. (143)}$$

The normalized convergence factors can also be given for the FMAA, i.e., $$G_j{}^N = \underline{M}^{-1} \hat{\underline{G}}_j \qquad \text{Eq. (144)}$$

where the inverse of the matrix $M = R_j{}^H R_j$ essentially normalized the gradient of the error energy of the filtered input. And $R_j$ is defined by $$\tilde{R}_j = \begin{bmatrix} \tilde{R}_{1,1,j} & \tilde{R}_{1,2,j} & \cdots & \tilde{R}_{1,N,j} \\ \tilde{R}_{2,1,j} & \tilde{R}_{2,2,j} & \cdots & \tilde{R}_{2,N,j} \\ \cdot & \cdot & \cdot & \cdot \\ \cdot & \cdot & \cdot & \cdot \\ \cdot & \cdot & \cdot & \cdot \\ \tilde{R}_{M,1,j} & \tilde{R}_{M,2,j} & \cdots & \tilde{R}_{M,N,j} \end{bmatrix} \qquad \text{Eq. (145)}$$

The gradient is again constrained as per Eq. (136) and Eq. (137). The normalization of the convergence factor may improve the convergence of the algorithm for the correlated inputs. In practical applications, one should check the condition of the sample power spectral matrix. If the matrix is ill conditioned, the convergence factors associated with very small sample power are preferably constrained to an upper bound. An averaging process is often useful for more accurate estimates of the power spectrum.

Similar to the FMAACs, the updates of the FMAAs can be e.g. block-by-block or sample-by-sample.

The computational complexity of frequency domain multichannel adaptive algorithms may also be evaluated in terms of the number of real multiplications and additions for each block of outputs. Based on similar analysis as given in above, the complexity of each algorithm is summarized in Table 4.

TABLE 4

| | Complexity of Frequency-Domain Algorithms | |
|---|---|---|
| Algorithms | Real Multiplications | Real Additions |
| FMAAC | (M + N + 1)L log₂(L/2) + 4MNL + 3NL | 1.5(M + N + 1)L log₂(L/2) + 3MNL + NL |
| FMOAAC | (M + N + 1)L log₂(L/2) + 6MNL + 2ML + 5NL (+ 1 division) | 1.5(M + N + 1)L log₂(L/2) + 5MNL + ML + 3NL |
| FMAA | 2(MN + M + 3N + 1)L log₂L + MNL² + 4ML + 3NL − ML | 3(MN + M + 3N + 1)L log₂L + MNL₂ + 3MNL + 3NL − ML |
| FMOAA | 2(MN + M + 4N + 1)L log₂L + MNL² + 8MNL + 8ML + 5NL − ML (= 1 division) | 3(MN + M + 4N + 1)L log₂L + MNL² + 7MNL + 5NL − ML |

In order to evaluate the computation savings of the frequency domain algorithms, define the following complexity ratios $$CR_5 = \frac{\text{multiplies} + \text{adds } MBAA}{\text{multiplies} + \text{adds } FMAAC} \qquad \text{Eq. (146)}$$

$$CR_6 = \frac{\text{multiplies} + \text{adds } MBAA}{\text{multiplies} + \text{adds } FMAA} \quad \text{Eq. (147)}$$

$$CR_7 = \frac{\text{multiplies} + \text{adds } MOBAA}{\text{multiplies} + \text{adds } FMOAAC} \quad \text{Eq. (148)}$$

and $$CR_8 = \frac{\text{multiplies} + \text{adds } MOBAA}{\text{multiplies} + \text{adds } FMOAA} \quad \text{Eq. (149)}$$

The complexity ration varies with the number of the channels. Table 5 gives the complexity comparisons with M=N 4 for different filter taps.

TABLE 5

| Complexity Ratio (M = N = 4) | Complexity Ratios The Filter Taps | | | | | |
|---|---|---|---|---|---|---|
| | 8 | 16 | 32 | 64 | 128 | 256 |
| $CR_5$ | 4.35 | 7.74 | 14.21 | 25.48 | 46.66 | 86 |
| $CR_6$ | 0.86 | 1.17 | 1.55 | 1.94 | 2.28 | 2.55 |
| $CR_7$ | 3.85 | 7.11 | 13.2 | 24.63 | 46.14 | 86.79 |
| $CR_8$ | 0.95 | 1.34 | 1.85 | 2.39 | 2.89 | 3.30 |

The above description is of preferred exemplary embodiments of the present invention, and the invention is not limited to the specific forms shown. For example, a floating-point digital signal processor could be employed instead of the fixed point Motorola chip described. As another example, the above methods and apparatus are also applicable to vibration control. Thus, modification may be made in the design and arrangement of the elements within the scope of the invention, as expressed in the appended claims.

That which is claimed is:

1. A system for actively attenuating primary vibrations, the system including:
   at least one actuator, responsive to drive signals applied thereto, for generating anti-vibrations for attenuating the primary vibrations by superposition of the anti-vibrations with the primary vibrations;
   at least one first sensing device for generating an error signal indicating the residual vibrations resulting from the superposition of the anti-vibrations and primary vibrations in the vicinity of a specific location;
   at least one second sensing device for generating an input signal indicating the primary vibrations;
   a controller, responsive to the input signal for generating the drive signals to the actuator, the drive signals being related to the input signal by a transfer function determined in accordance with a multichannel block adaptive algorithm in response to the error signals, the algorithm having a convergence factor which varies in accordance with a predetermined parameter.

2. A system for actively attenuating primary vibrations, the system including:
   at least one actuator, responsive to drive signals applied thereto, for generating anti-vibrations for attenuating the primary vibrations by superposition of the anti-vibrations with the primary vibrations;
   at least one first sensing device for generating an error signal indicating the residual vibrations resulting from the superposition of the anti-vibrations and primary vibrations in the vicinity of a specific location;
   at least one second sensing device for generating an input signal indicating the primary vibrations;
   a controller, responsive to the input signal for generating the drive signals to the actuator, the drive signals being related to the input signal by a transfer function determined in accordance with a multichannel optimal block adaptive algorithm in response to the error signals, the algorithm having a convergence factor which varies in accordance with a predetermined parameter.

3. A system for actively attenuating primary vibrations, the system including:
   at least one actuator, responsive to drive signals applied thereto, for generating anti-vibrations for attenuating the primary vibrations by superposition of the anti-vibrations with the primary vibrations;
   at least one first sensing device for generating an error signal indicating the residual vibrations resulting from the superposition of the anti-vibrations and primary vibrations in the vicinity of a specific location;
   at least one second sensing device for generating an input signal indicating the primary vibrations;
   a controller, responsive to the input signal for generating the drive signals to the actuator, the drive signals being related to the input signal by a transfer function determined in accordance with a multichannel circular convoluted frequency domain optimal block adaptive algorithm in response to the error signals, the algorithm having a convergence actor which varies in accordance with a predetermined parameter.

4. A system for actively attenuating primary vibrations, the system including:
   at least one actuator, responsive to drive signals applied thereto, for generating anti-vibrations for attenuating the primary vibrations by superposition of the anti-vibrations with the primary vibrations;
   at least one first sensing device for generating an error signal indicating the residual vibrations resulting from the superposition of the anti-vibrations and primary vibrations in the vicinity of a specific location;
   at least one second sensing device for generating an input signal indicating the primary vibrations;
   a controller, responsive to the input signal for generating the drive signals to the actuator, the drive signals being related to the input signal by a transfer function determined in accordance with a multichannel linear convoluted optimal adaptive algorithm in response to the error signals, the algorithm having a convergence factor which varies in accordance with a predetermined parameter.

5. A system for actively attenuating primary vibrations, the system including:
   a predetermined number of actuators, responsive to drive signals applied thereto, for generating anti-vibrations for attenuating the primary vibrations by superposition of the anti-vibrations with the primary vibrations;
   a predetermined number of first sensing devices, each generating an error signal indicating the residual vibrations resulting from the superposition of the anti-vibrations and primary vibrations in the vicinity of a specific location;
   a predetermined number of second sensing devices, each generating an input signal indicating the primary vibrations;

a controller, responsive to the input signals and the error signals, for generating the drive signals to the actuator, the drive signals being related to the input signals by a transfer function determined and updated in accordance with a predetermined algorithm in response to the error signals, the algorithm comprising a multichannel block adaptive algorithm.

* * * * *